US012743974B2

(12) United States Patent
Yoneda

(10) Patent No.: US 12,743,974 B2
(45) Date of Patent: Sep. 22, 2026

(54) AUTOMOBILE

(71) Applicant: Nissan Motor Co., Ltd., Yokohama (JP)

(72) Inventor: Yasunari Yoneda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 19/106,688

(22) PCT Filed: Sep. 26, 2022

(86) PCT No.: PCT/JP2022/035683
§ 371 (c)(1),
(2) Date: Feb. 26, 2025

(87) PCT Pub. No.: WO2024/069692
PCT Pub. Date: Apr. 4, 2024

(65) Prior Publication Data

US 2026/0024474 A1 Jan. 22, 2026

(51) Int. Cl.
*B60W 50/08* (2020.01)
*A63F 13/245* (2014.01)
(Continued)

(52) U.S. Cl.
CPC .......... *G09G 3/001* (2013.01); *A63F 13/245* (2014.09); *A63F 13/803* (2014.09); *B60J 1/00* (2013.01);
(Continued)

(58) Field of Classification Search
CPC .............. G09G 3/001; G09G 2354/00; G09G 2380/10; A63F 13/245; A63F 13/803;
(Continued)

(56) References Cited

U.S. PATENT DOCUMENTS 11,557,234 B1 * 1/2023 Eudy .................... B60K 35/60
2010/0253541 A1 * 10/2010 Seder ................. G08G 1/0962 340/905
(Continued)

FOREIGN PATENT DOCUMENTS

JP 2012-239547 A 12/2012
JP 2014-119657 A 6/2014
(Continued)

OTHER PUBLICATIONS

Moriwaki, Tesla plays games on its in-car display, with the latest title being "Beach Buggy Racing 2" . . . Operated by steering wheel and pedals, Automotive Media Response. https://response.jp, Jun. 23, 2019, Japan.

*Primary Examiner* — Abdul-Samad A Adediran
(74) *Attorney, Agent, or Firm* — Spencer Fane LLP

(57) ABSTRACT

An automobile includes an entertainment execution device, a display device and a mode select controller. The entertainment execution device executes entertainment software, communicates with radio control equipment, or plays back a video content. The display device displays an image output from the entertainment execution device on a windshield or on a flexible display capable of being raised or lowered between a front windshield and a steering wheel. The mode select controller enables selection between an entertainment mode for operating the entertainment execution device and a driving mode for driving the automobile and executes control according to each mode. The mode select controller controls the display device to display the image output in a first region of the windshield in the driving mode, and to display the image output in a second region of the windshield or on the flexible display in a raised state in the entertainment mode.

19 Claims, 21 Drawing Sheets

(51) Int. Cl.

| | |
|---|---|
| ***A63F 13/803*** | (2014.01) |
| ***B60J 1/00*** | (2006.01) |
| ***B60J 3/04*** | (2006.01) |
| ***B62D 5/00*** | (2006.01) |
| ***G06F 3/01*** | (2006.01) |
| ***G06V 20/58*** | (2022.01) |
| ***G09G 3/00*** | (2006.01) |
| *A63H 30/04* | (2006.01) |
| *B60R 1/04* | (2006.01) |

(52) U.S. Cl.
CPC ................ *B60J 3/04* (2013.01); *B62D 5/001* (2013.01); *G06F 3/011* (2013.01); *G06V 20/58* (2022.01); *A63H 30/04* (2013.01); *B60R 1/04* (2013.01); *G06F 3/016* (2013.01); *G09G 2354/00* (2013.01); *G09G 2380/10* (2013.01)

(58) Field of Classification Search
CPC ......... G06V 20/58; G06V 40/171; B60J 3/04; B60J 1/00; B62D 5/001; G06F 3/011; G06F 3/016; A63H 30/04; B60R 1/04; B60W 10/10; B60K 35/60
See application file for complete search history.

(56) References Cited

U.S. PATENT DOCUMENTS

| | | | | |
|---|---|---|---|---|
| 2017/0334455 | A1* | 11/2017 | Asakura ................ | B60W 10/10 |
| 2021/0197724 | A1* | 7/2021 | Gu ....................... | G06V 40/171 |

FOREIGN PATENT DOCUMENTS

| | | | |
|---|---|---|---|
| JP | 2019-156325 | A | 9/2019 |
| JP | 2020-117172 | A | 8/2020 |
| WO | 2021/166706 | A1 | 8/2021 |

* cited by examiner

AUTOMOBILE

CROSS-REFERENCE TO RELATED APPLICATIONS

This application is a U.S. national stage application of International Application No. PCT/JP2022/035683, filed on Sep. 26, 2022.

BACKGROUND

Technical Field

The present invention relates to an automobile and more particularly to an automobile that allows entertainment to be enjoyed in the automobile cabin.

Background Information

Automobiles are known that allow racing games to be enjoyed in the automobile cabin by operating various kinds of operation equipment such as a display, a steering wheel, an accelerator pedal, and a brake pedal provided in the automobile cabin (see the article of https://response.jp/article/2019/06/23/323716.html Automotive Media Response website, article published on Jun. 23, 2019, "Play games on Tesla's onboard display, latest title is 'Beach Buggy Racing 2' . . . Operate with steering wheel and pedals").

SUMMARY

In the above conventional automobile, however, the display which displays the game content is provided on the center console, and the driver's line of sight is directed downward and toward the center of the vehicle, thus causing neck fatigue, which may be problematic.

A problem to be solved by the present invention is to provide an automobile in which entertainment such as games can be enjoyed in the automobile cabin with a comfortable posture.

The present invention solves the above problem by displaying, in an automobile equipped with an entertainment execution device, an image output from the entertainment execution device on a windshield or on a flexible display capable of being raised or lowered between a front windshield and a steering wheel.

According to the present invention, it is possible to enjoy entertainment such as games in the automobile cabin with a comfortable posture.

BRIEF DESCRIPTION OF DRAWINGS

Referring now to the attached drawings which form a part of this original disclosure, illustrative embodiments are shown.

(raised state/entertainment mode).

Figure 1:
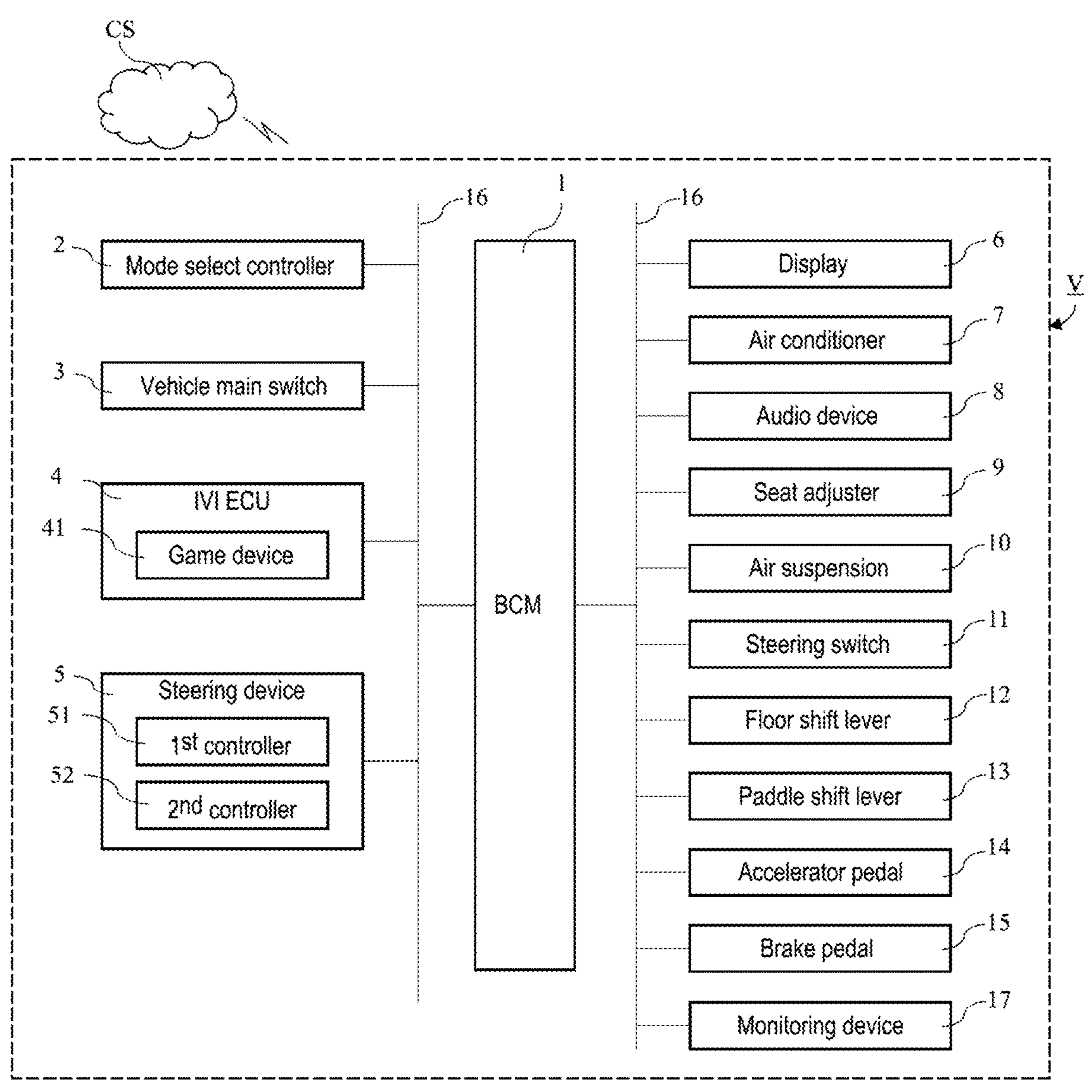
FIG. 1 is a block diagram illustrating an embodiment of an automobile according to the present invention.
Figure 7A:
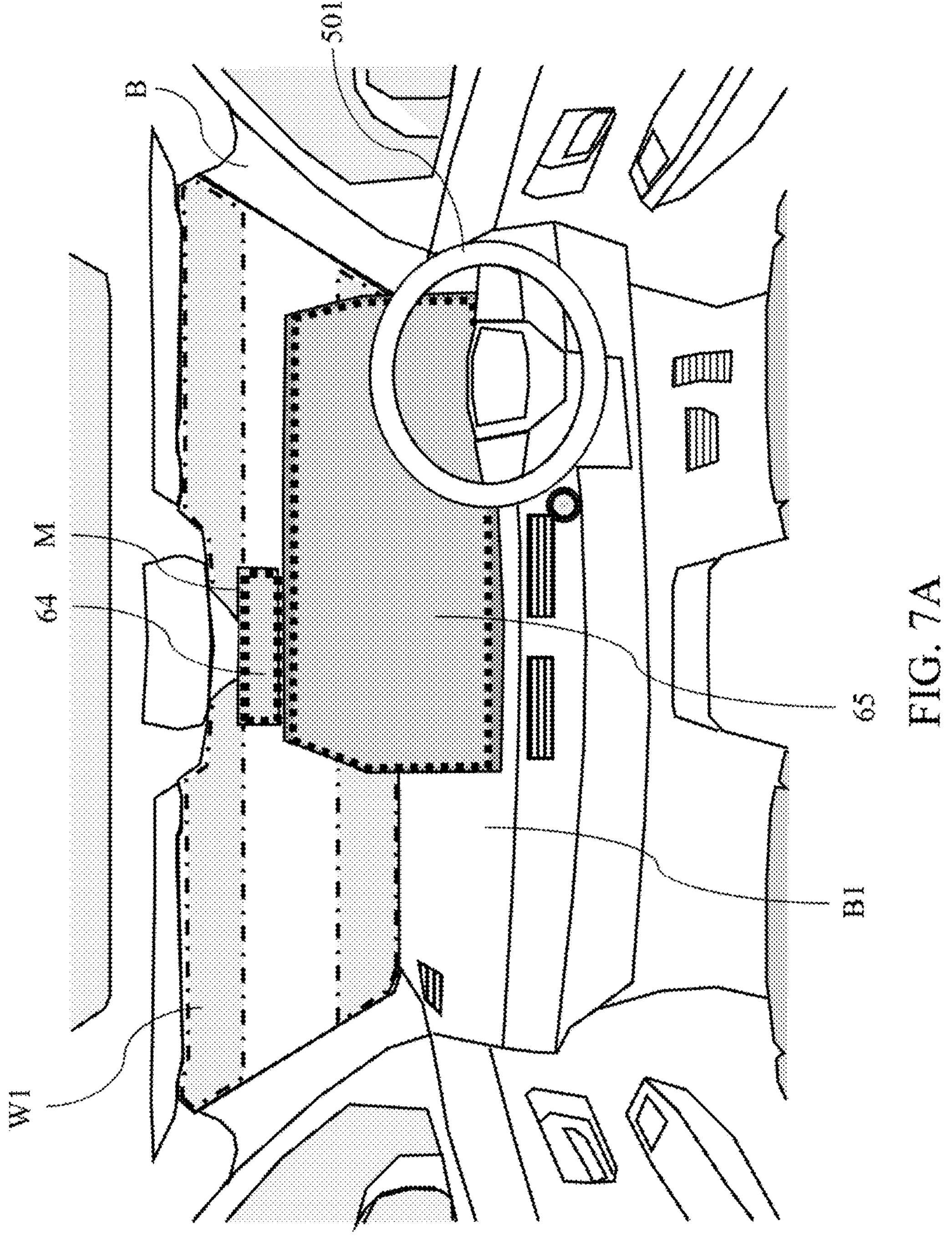
FIG. 7A is a diagram illustrating another example of the display device of FIG.
Figure 7B:
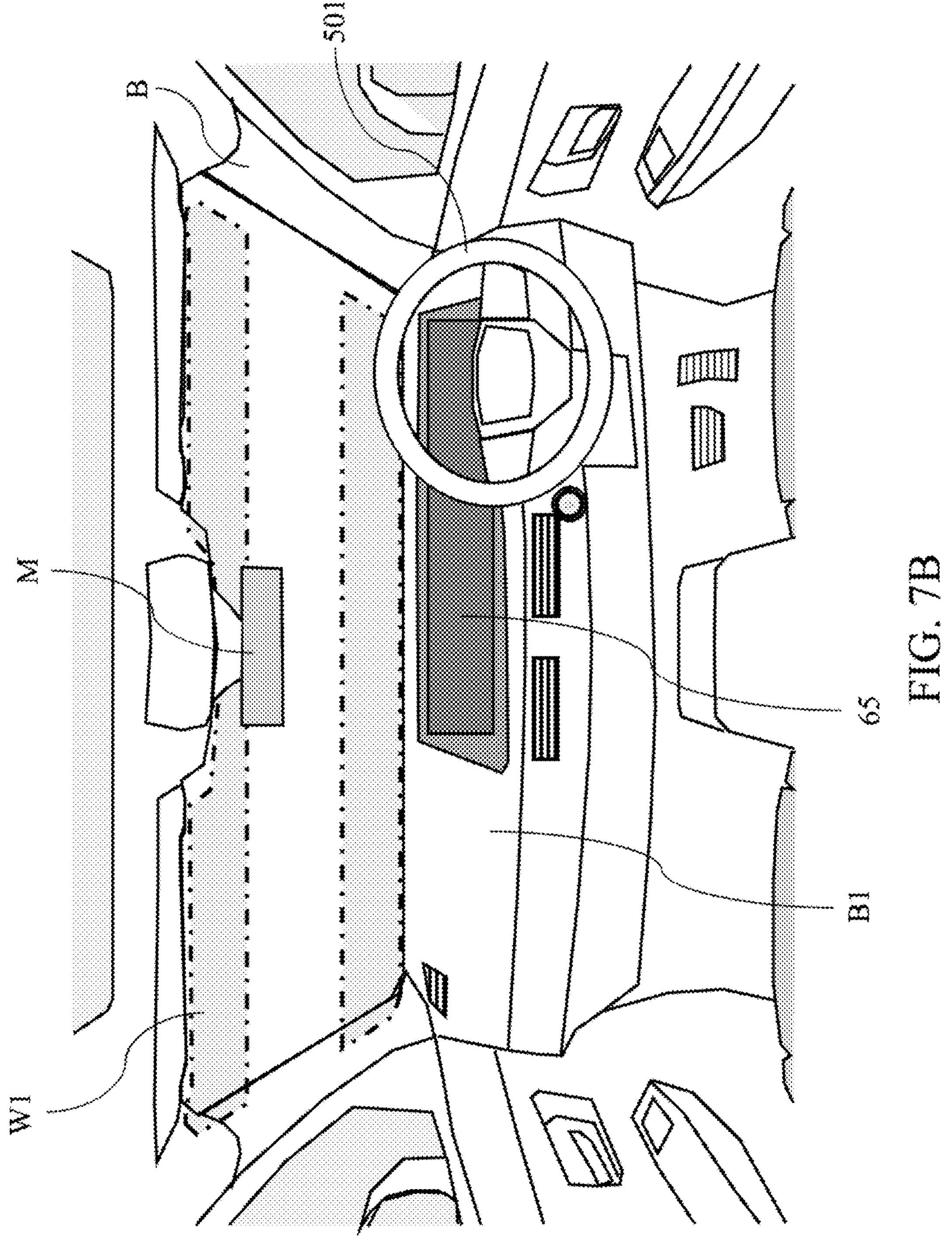

FIG. 7B is a diagram illustrating another example of the display device of FIG. 1 (lowered state/driving mode).

Figure 8A:
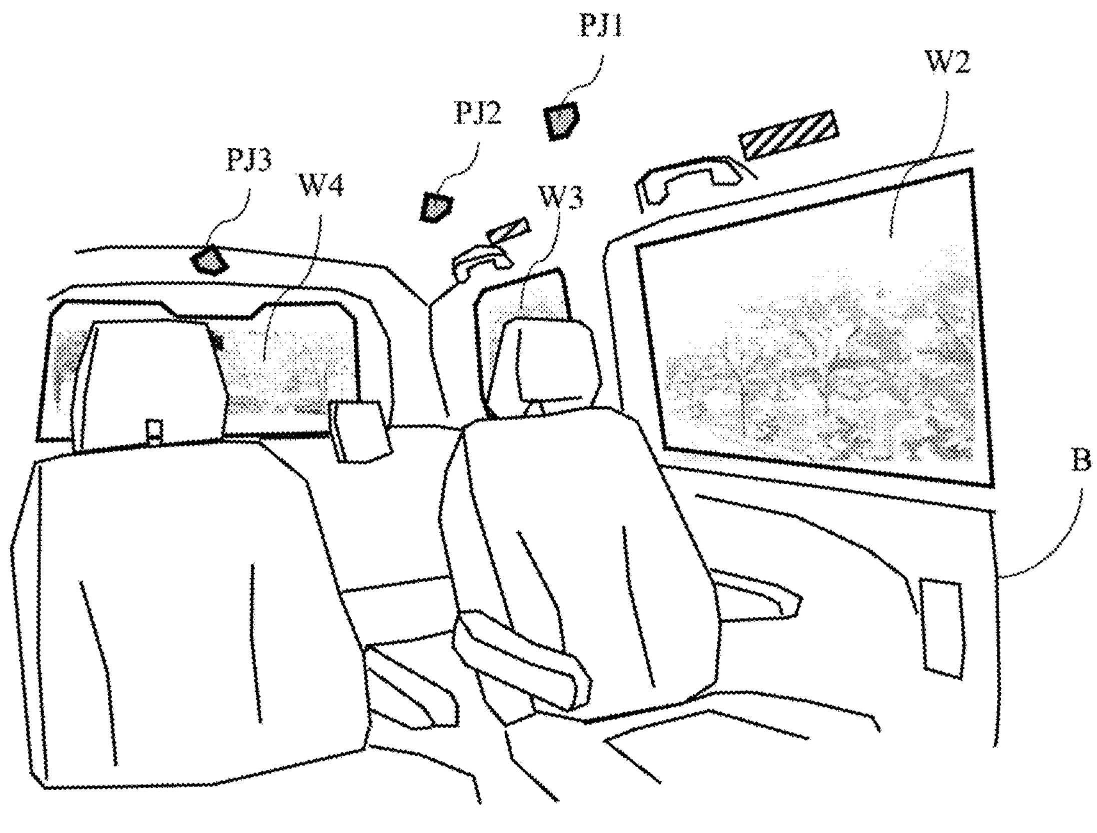

FIG. 8A is a diagram illustrating still another example of the display device of FIG. 1 (driving mode).

Figure 8B:
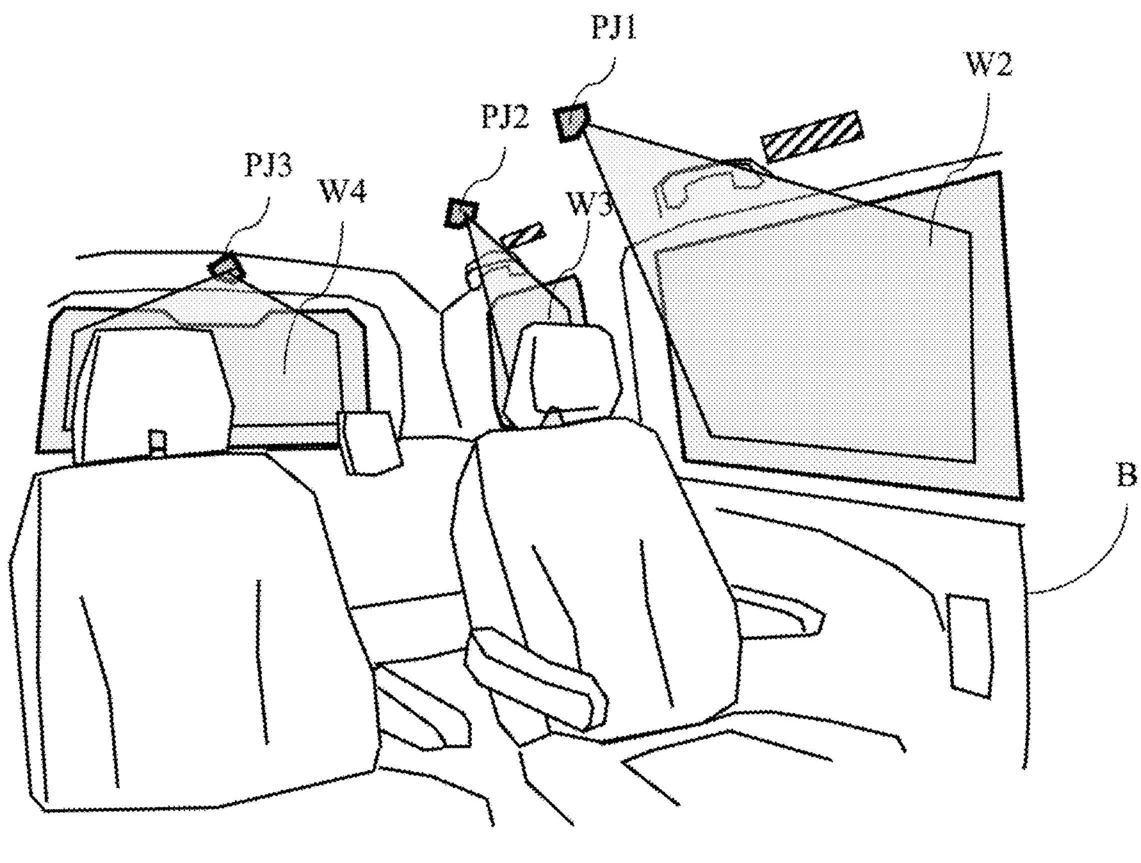

FIG. 8B is a diagram illustrating still another example of the display device of FIG. 1 (entertainment mode).

Figure 9:
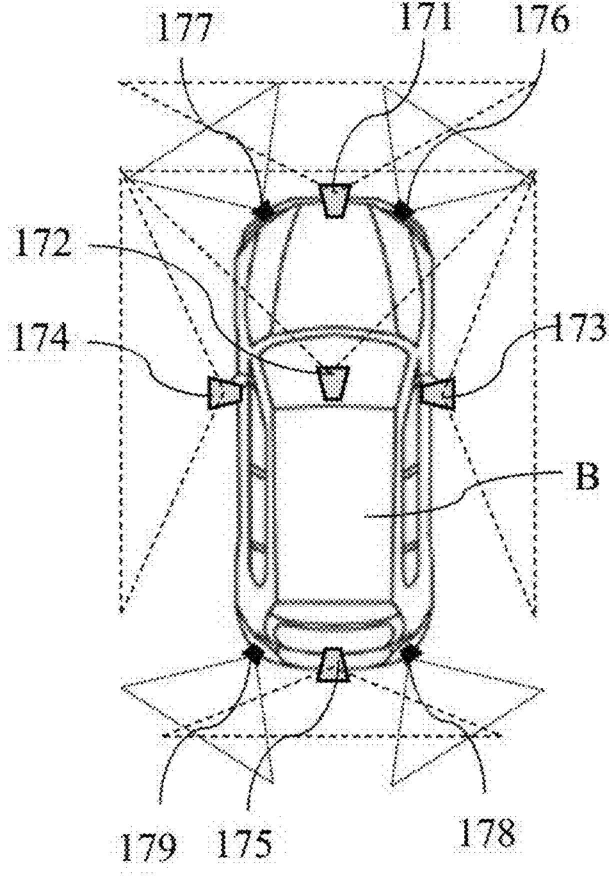

FIG. 9 is a plan view illustrating an example of the monitoring device of FIG. 1.

Figure 10:
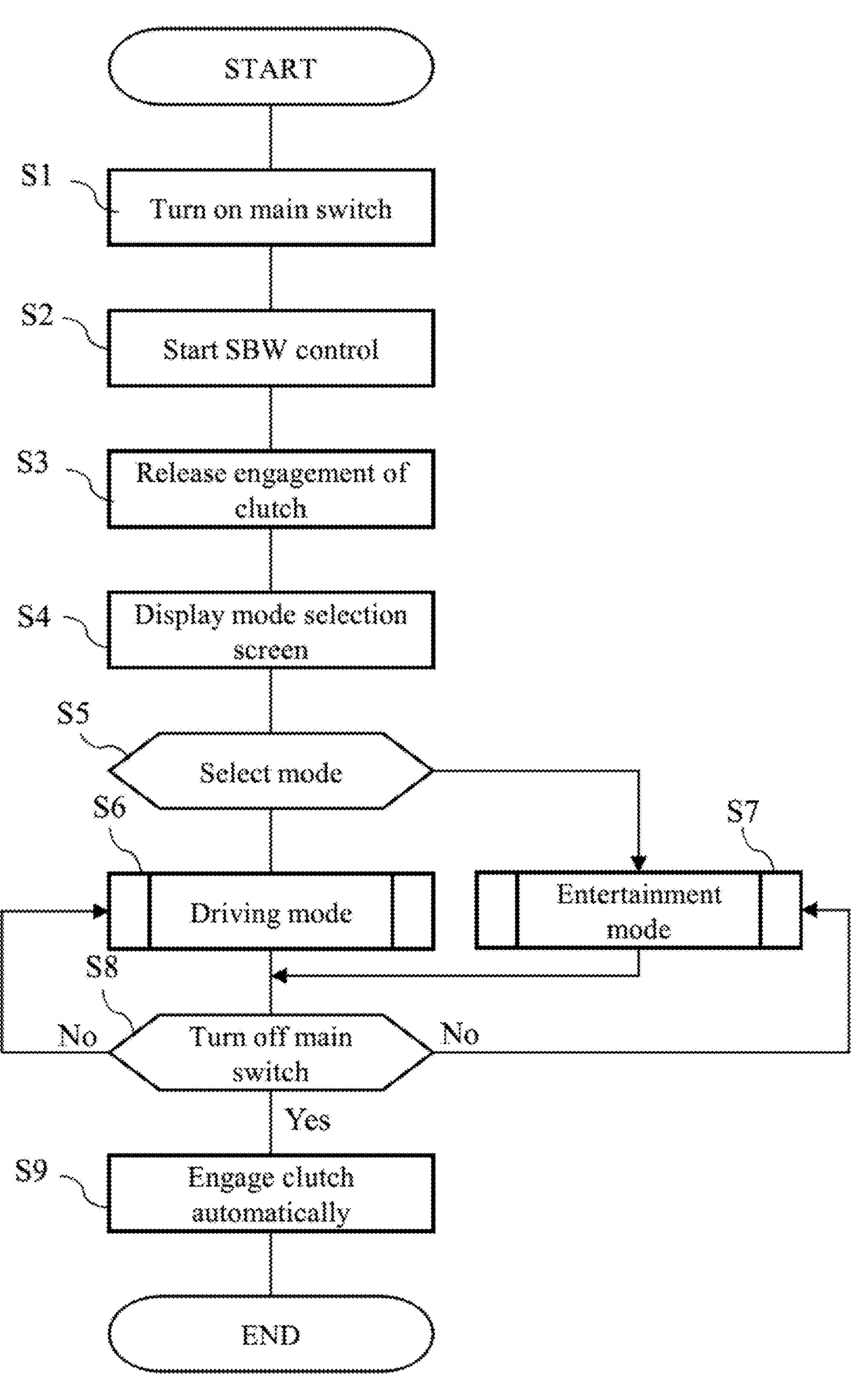

FIG. 10 is a flowchart illustrating an information processing flow executed by the automobile of FIG. 1.

Figure 11A:
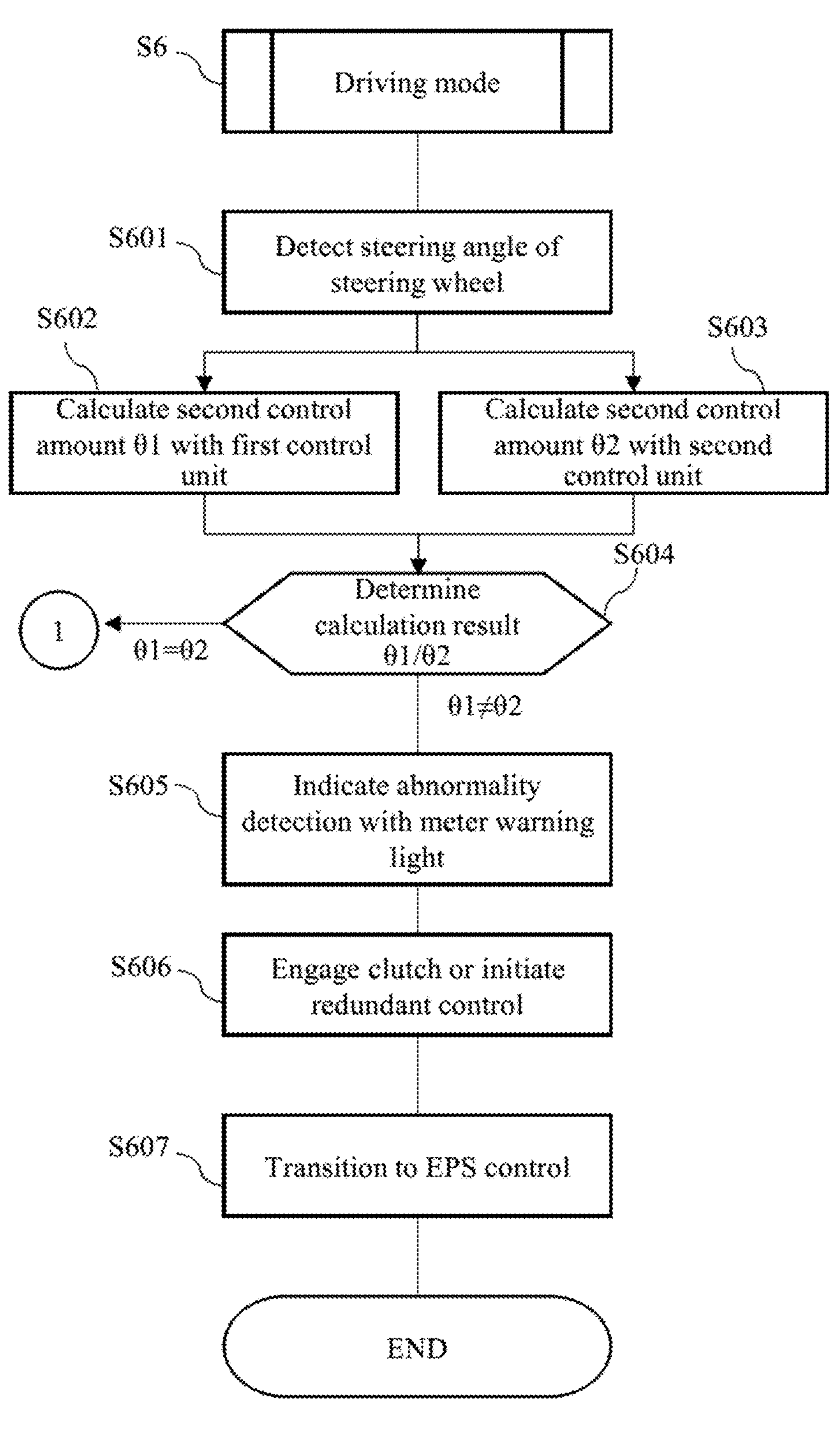

FIG. 11A is a flowchart (part 1) illustrating the subroutine for the driving mode (S6) of FIG. 10.

Figure 11B:
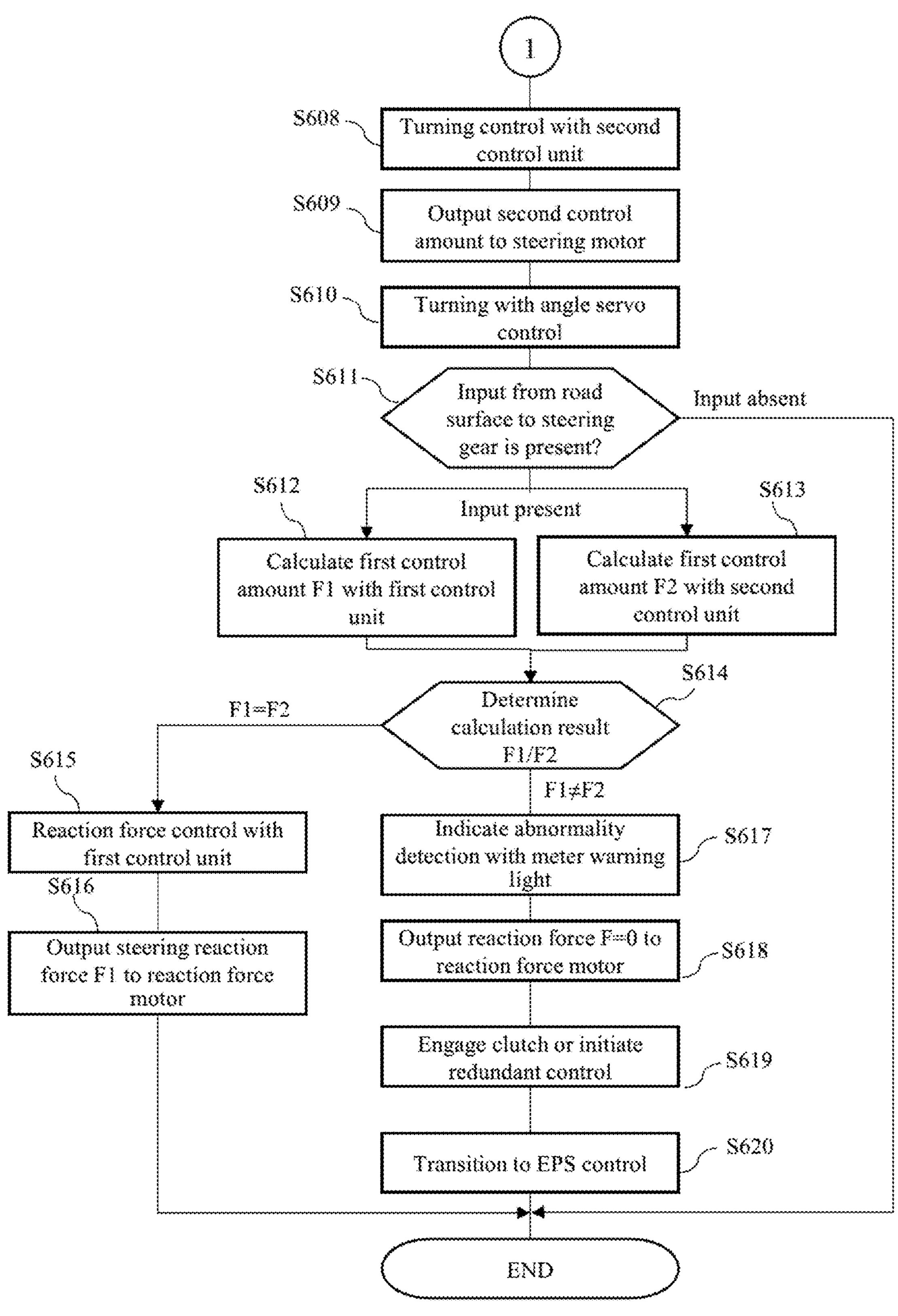

FIG. 11B is a flowchart (part 2) illustrating the subroutine for the driving mode (S6) of FIG. 10.

Figure 12:
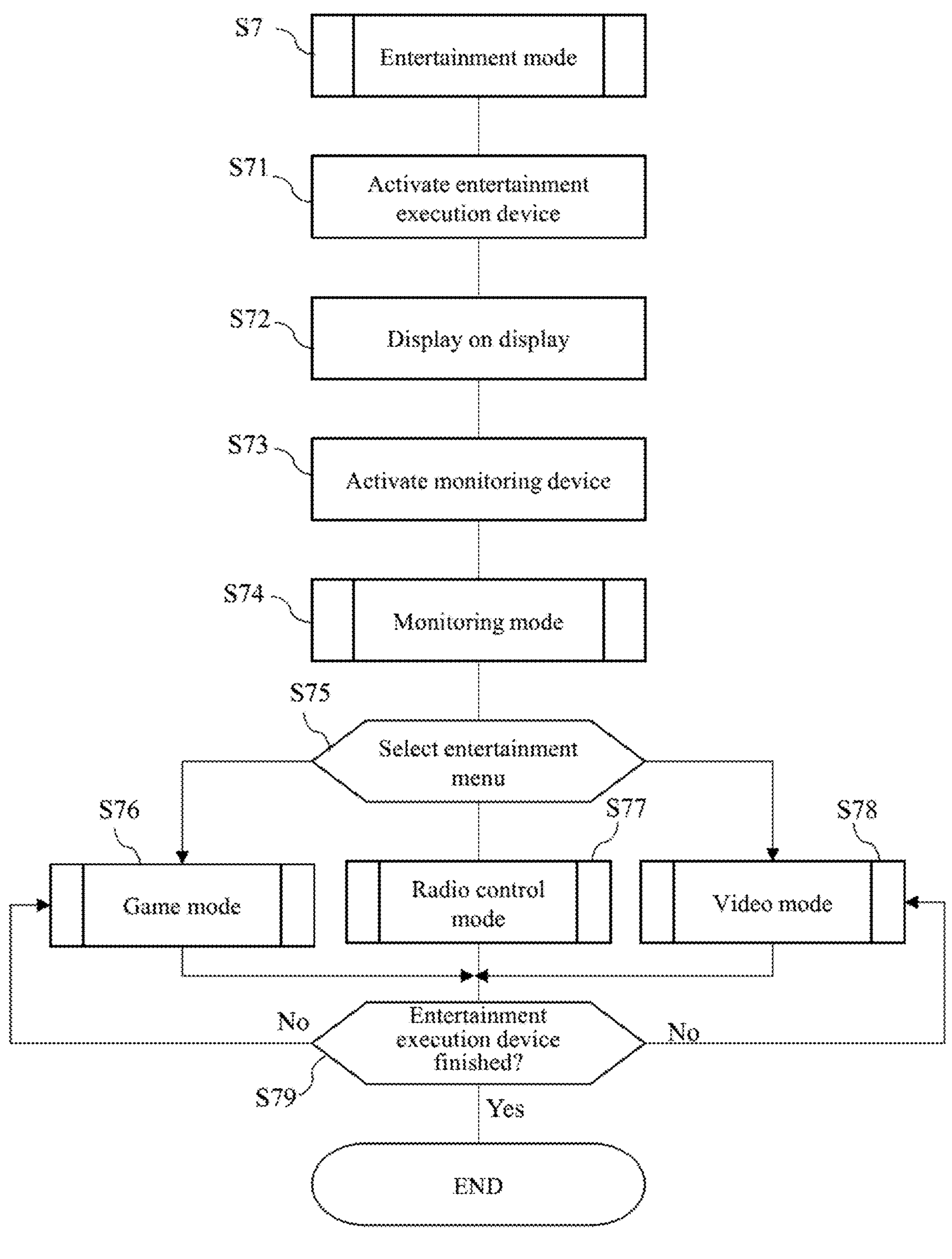

FIG. 12 is a flowchart illustrating the subroutine for the entertainment mode (S7) of FIG. 10.

Figure 13:
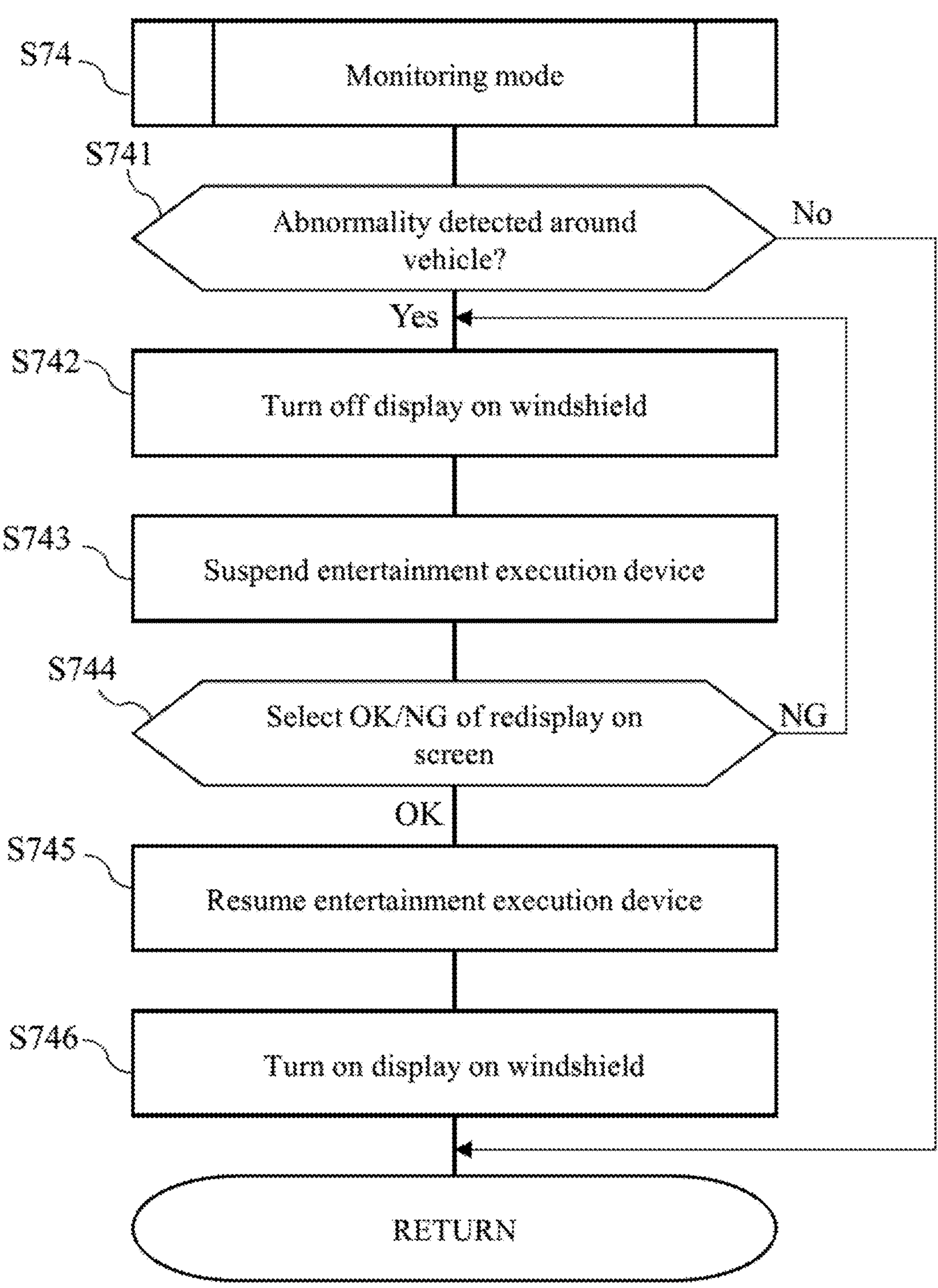

FIG. 13 is a flowchart illustrating the subroutine for the monitoring mode (S74) of FIG. 12.

Figure 14A:
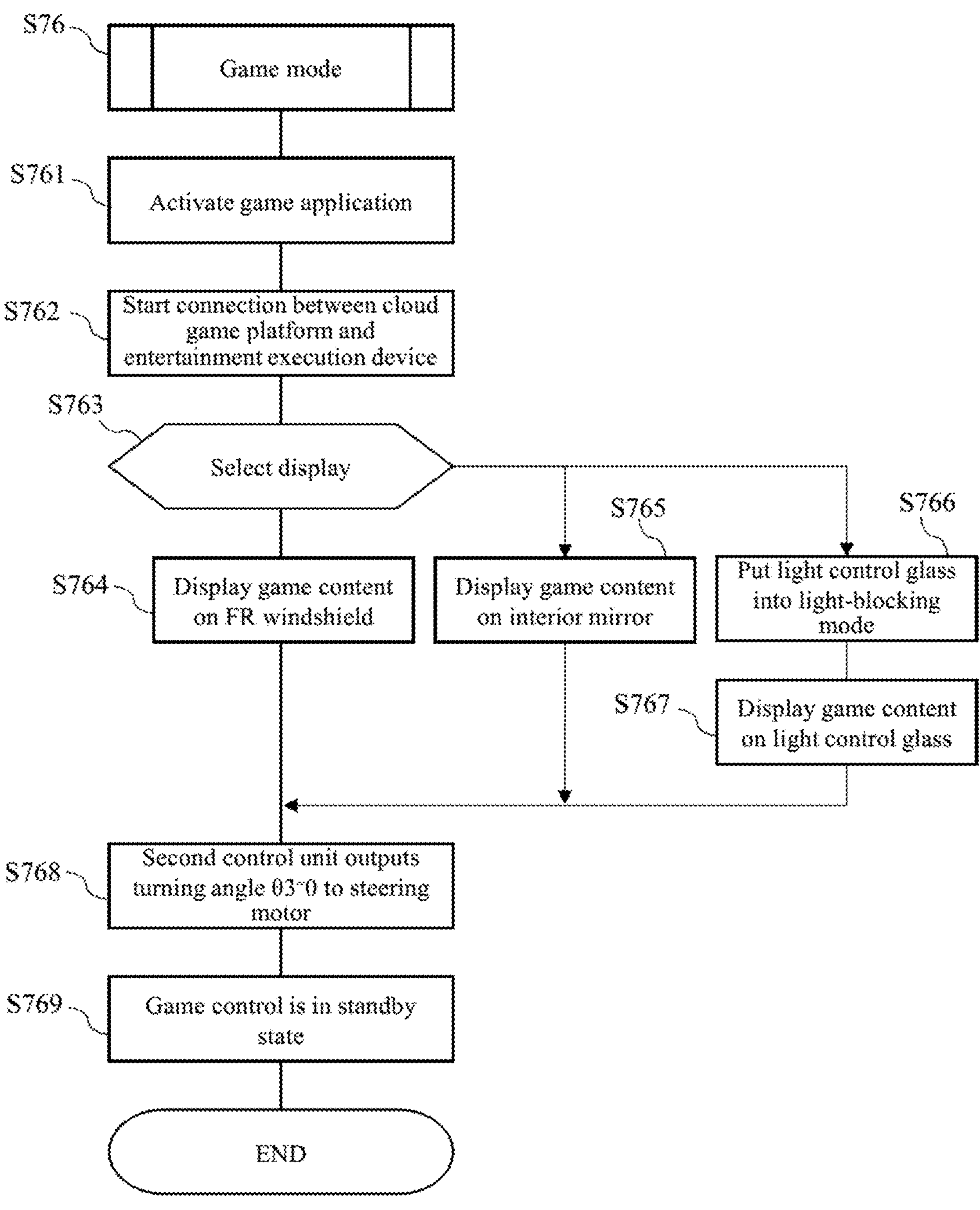

FIG. 14A is a flowchart (part 1) illustrating the subroutine for the game mode (S76) of FIG. 12.

Figure 14B:
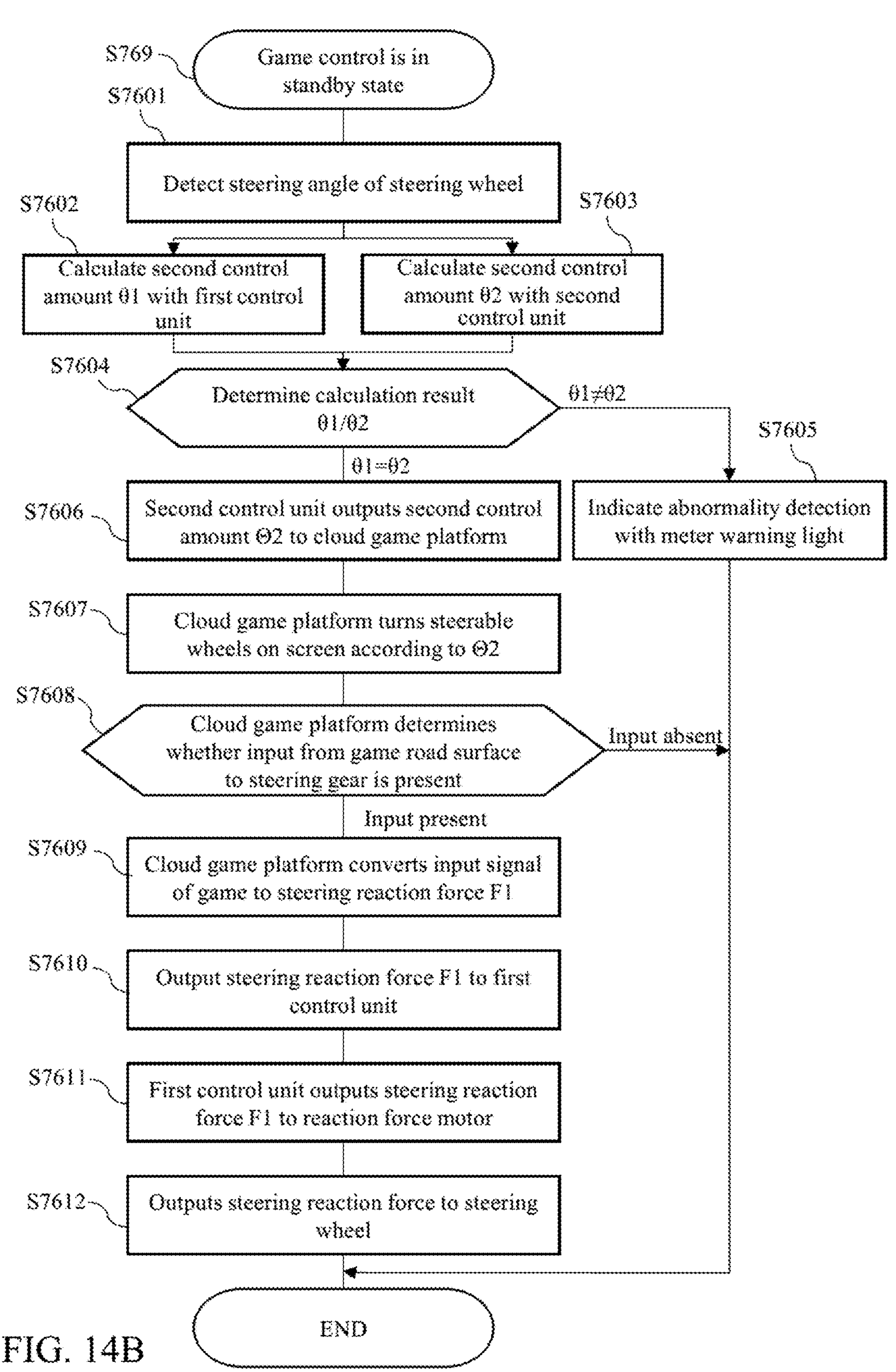

FIG. 14B is a flowchart (part 2) illustrating the subroutine for the game mode (S76) of FIG. 12.

Figure 15A:
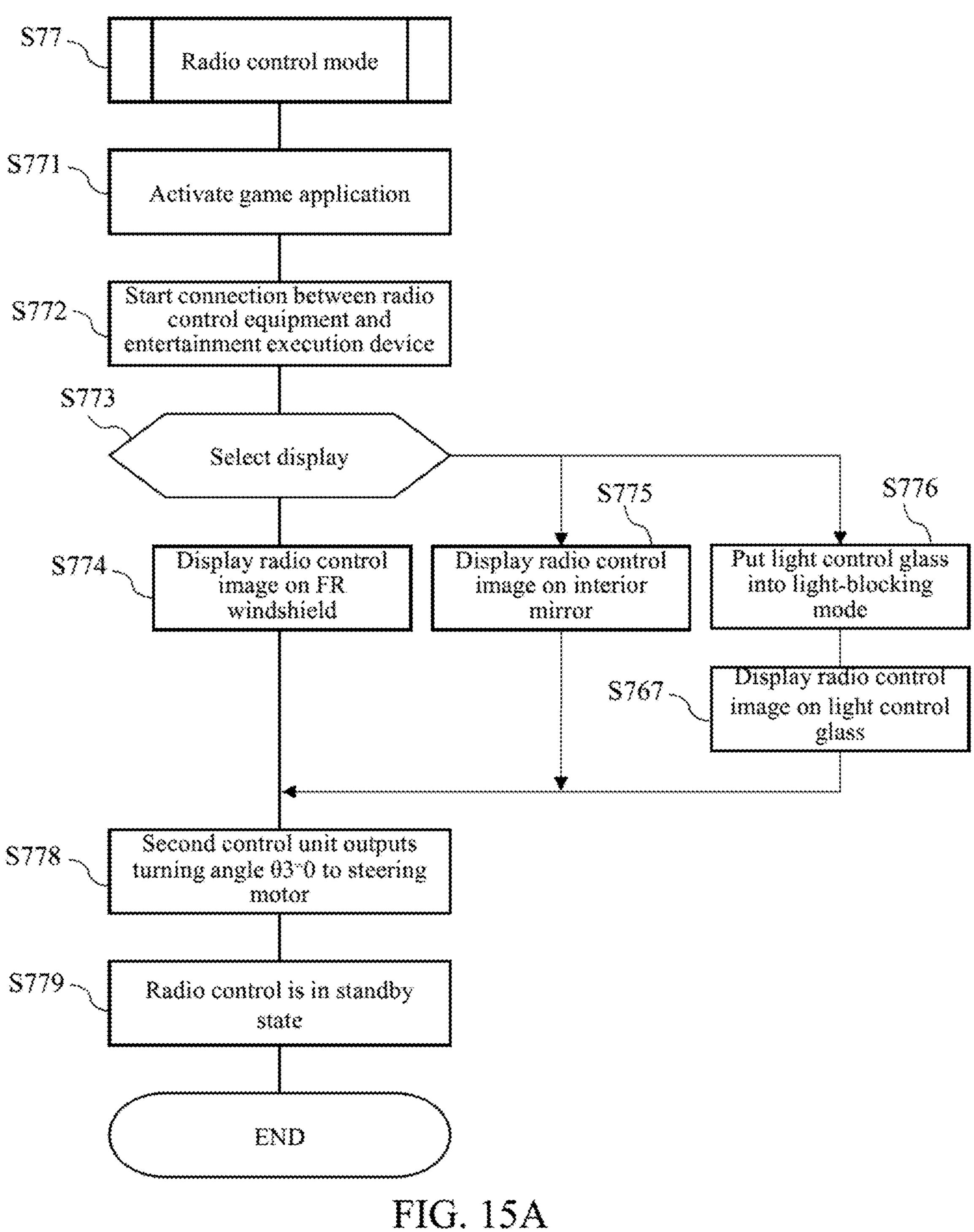

FIG. 15A is a flow chart (part 1) illustrating the subroutine for the radio control mode (S77) of FIG. 12.

Figure 15B:
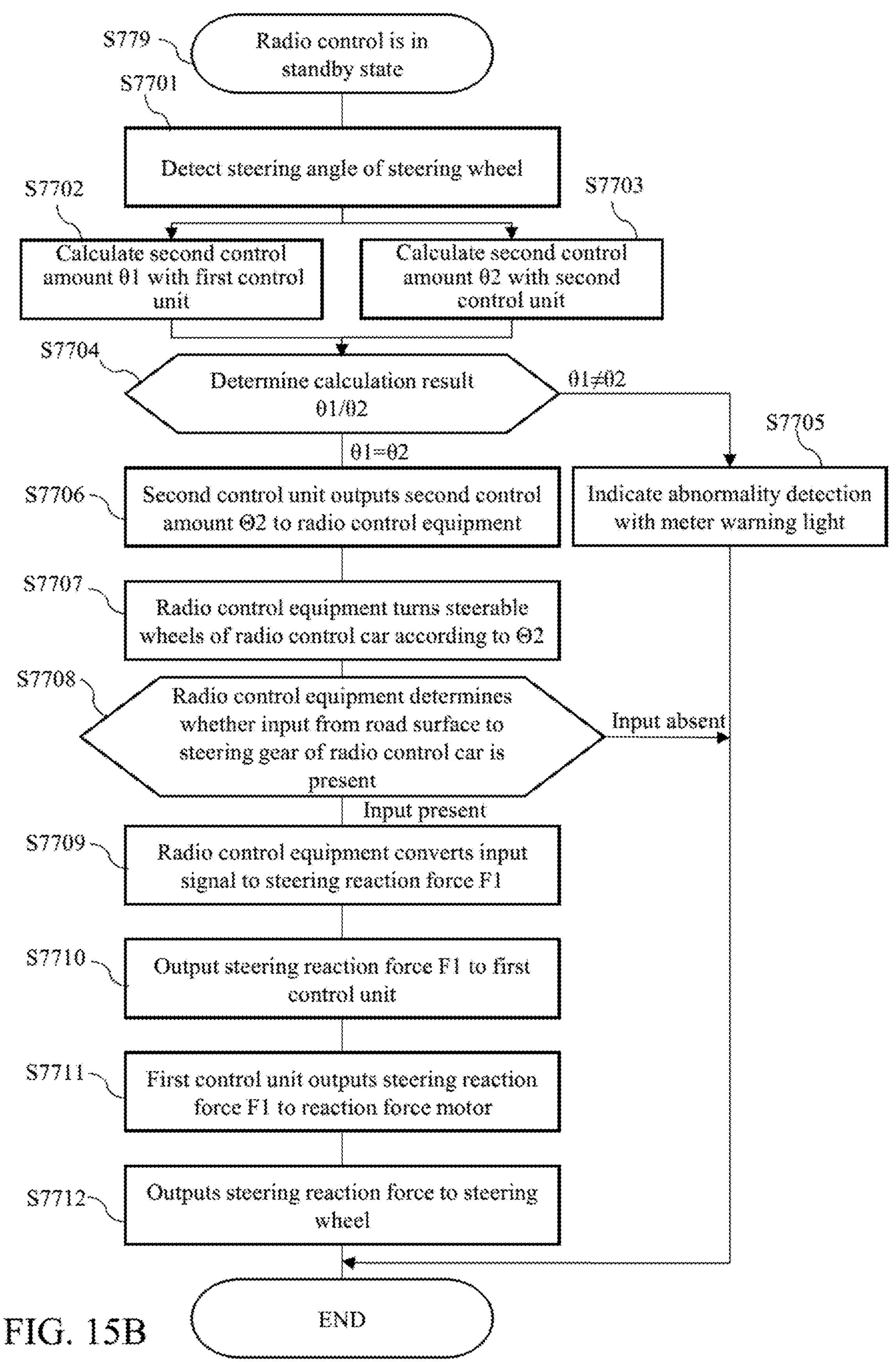

FIG. 15B is a flow chart (part 2) illustrating the subroutine for the radio control mode (S77) of FIG. 12.

Figure 16:
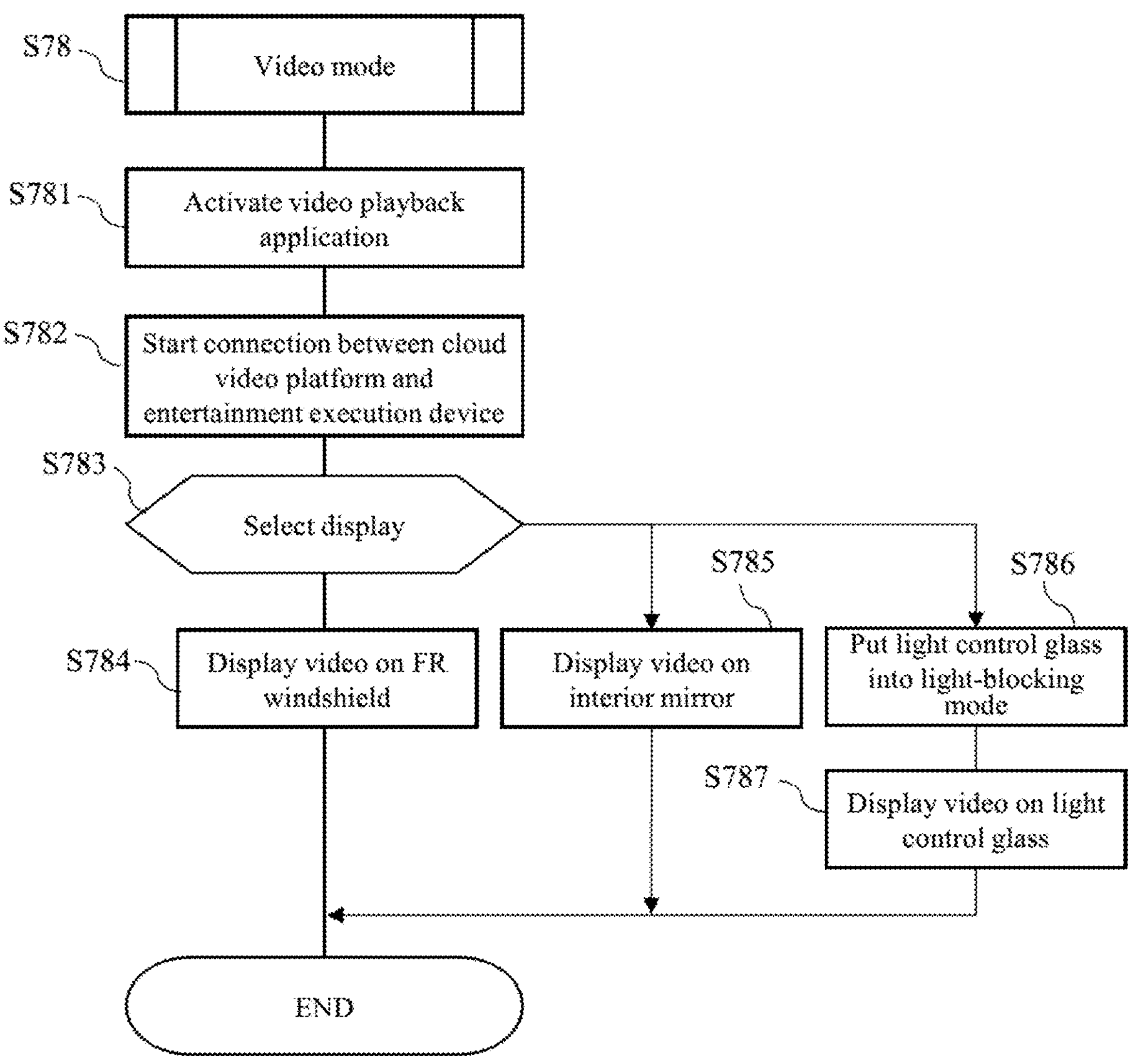

FIG. 16 is a flow chart illustrating the subroutine for the video mode (S78) of FIG. 12.

DETAILED DESCRIPTION OF EMBODIMENTS

Hereinafter, an example of an embodiment for carrying out the present invention will be described with reference to the drawings. FIG. 1 is a block diagram illustrating an embodiment of the automobile according to the present invention. Automobile V of the present embodiment is equipped with an entertainment execution device 41. The entertainment execution device 41 is activated in a state in which the automobile V is stopped, and the occupants of the automobile V can enjoy racing games, maneuvering of radio control toys, etc. in the automobile cabin by operating various kinds of operation equipment such as a display device 6, a steering wheel 501, an accelerator pedal 14, and a brake pedal 15 provided in the automobile cabin. In addition, the automobile V of the present embodiment allows the entertainment execution device 41 to play back movies and other video content on the display device 6, making it possible to watch videos within the automobile cabin.

To this end, the automobile V of the present embodiment includes: the entertainment execution device 41 that executes games and other entertainment software, communicates with radio control toys and other radio control equipment, or plays back a video content; and the display device 6 that displays an image output from the entertainment execution device 41 on a windshield W or on a flexible display 65 capable of being raised or lowered between a front windshield W1 and the steering wheel 501.

The automobile V of the present embodiment also includes: a steering device 5 of a so-called steering-by-wire (SBW) type in which the steering wheel 501 is mechanically separated from steerable wheels 502 and the operation of the steering wheel 501 is transmitted to the steerable wheels 502 as an electrical signal, and a mode select controller 2 that can select between an entertainment mode for operating the entertainment execution device 41 and a driving mode for driving the automobile V. Note, however, that the steering device 5 of steering-by-wire type and the mode select controller 2 are not essential components of the automobile according to the present invention, and may be omitted.

Figure 6:
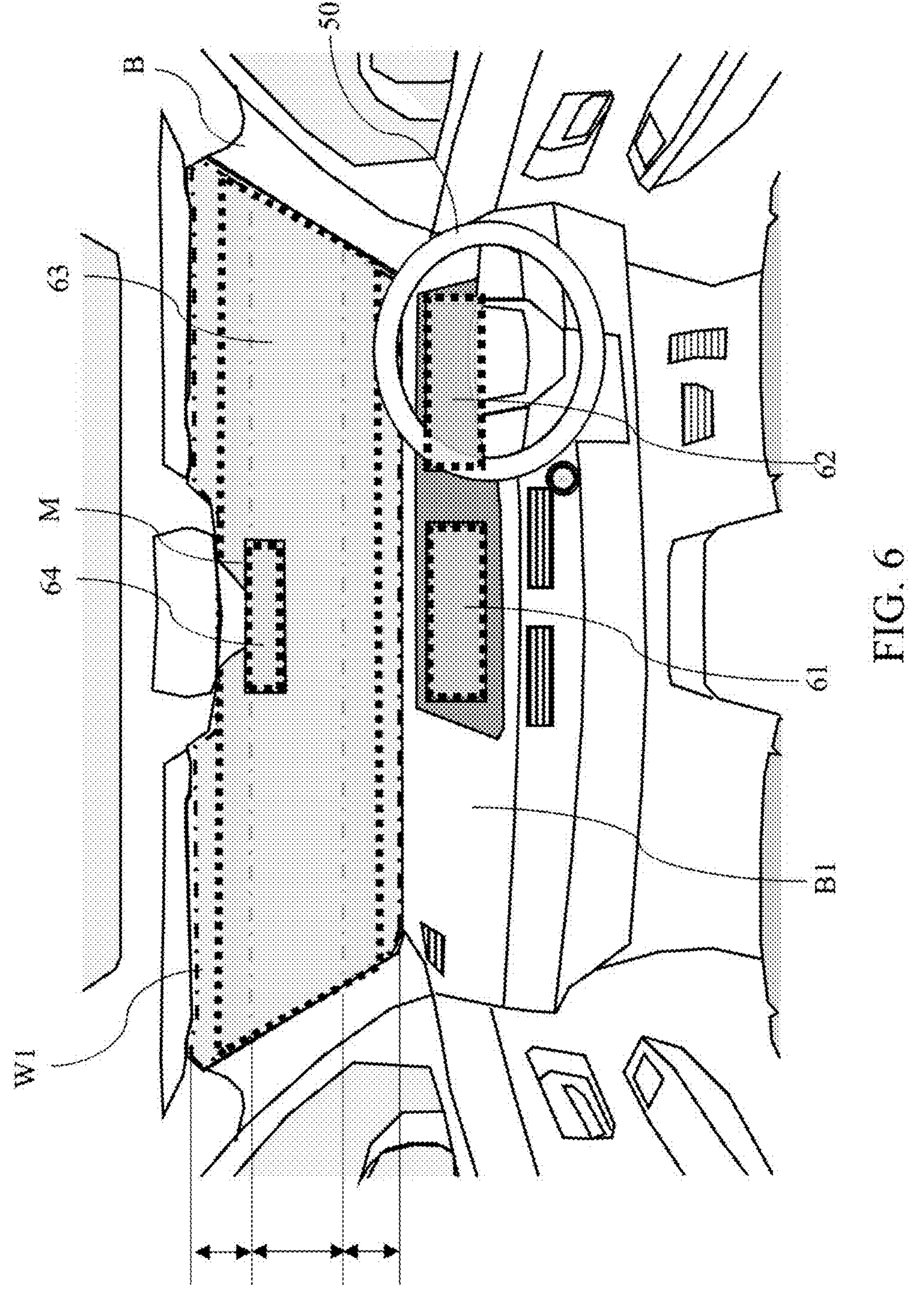
FIG. 6 is a diagram illustrating an example of the display device of FIG. 1.

First, the display device 6 of the present embodiment will be described. FIG. 6 is a diagram illustrating an example of the display device of the present embodiment, and is a diagram when the front of a vehicle is viewed from inside the vehicle cabin. The display device 6 of the present embodiment includes a center display 61 and a meter display 62 that are provided on an instrument panel B1, as well as a display 63 provided on a front windshield W1 and a display 64 provided on an interior mirror M.

The surface of the front windshield W1 includes a first region R1 that is legally permitted for display of information or the like and a second region R2 that is not legally permitted for display in order to ensure forward visibility under regulations such as the Road Traffic Act. The upper end portion and lower end portion of the front windshield W1 illustrated in FIG. 6 are each the first region R1 that is permitted for display of information, and the central region therebetween is the second region R2 that is not permitted for display of information. The display 63 provided on the front windshield W1 of this example is set in a range that includes at least the second region R2, and preferably in the entire front windshield W1.

Specific means for providing the display 63 on the front windshield W1 is not particularly limited, but for example, it can be achieved by providing a thin-film display composed of organic light-emitting diodes (OLEDs) on the front windshield W1. It can also be achieved through forming the front windshield W1 with light control glass having an electronic light-blocking function and providing a projector on the roof trim or the like to project an image onto the light control glass in a light-blocking mode. Additionally or alternatively, a head-up display device may be used to project a virtual image onto the front windshield W1 to serve as the display 63.

The display 64 provided on the interior mirror M can be configured of a liquid crystal display, and may be shared with the display of an electronic interior mirror. The center display 61 displays map information from a navigation device, input/output information from an air conditioner 7, input/output information from an audio device 8, etc., while the meter display 62 displays various information items related to the driving state, such as a speed and a remaining amount of fuel.

The display device 6 of the present embodiment is not limited to the display 63 or the like provided on the front windshield W1, and may include other types of displays. FIGS. 7A and 7B are diagrams illustrating another example of the display device 6 of the present embodiment. FIG. 7A illustrates the flexible display 65 of this example in a raised state (entertainment mode), and FIG. 7B illustrates the flexible display 65 of this example in a lowered state (driving mode), both of which are diagrams when the front of the vehicle is viewed from inside the vehicle cabin.

The flexible display 65 of this example is provided on an instrument panel B1 between the front windshield W1 and the steering wheel 501, and is provided so as to be capable of being raised or lowered between the raised position illustrated in FIG. 7A and the lowered position illustrated in FIG. 7B. The flexible display 65 of this example can be configured, for example, of a sheet-shaped organic EL display, and by winding/unwinding the sheet-shaped organic EL display inside the instrument panel B1, a lifting and lowering mechanism for the flexible display 65 can be achieved in a small space.

When the driving mode is selected with the mode select controller 2 described later and driving operation for the automobile V is performed, the flexible display 65 of this example is in a lowered state as illustrated in FIG. 7B, and the forward visibility can be ensured through the entire front windshield W1. That is, the flexible display 65 of this example is lowered to a position that does not obstruct the forward visibility. In this lowered state, a part of the flexible display 65 projects from the instrument panel B1, and its display surface displays the information to be displayed on the center display 61 and the meter display 62.

In contrast, when the entertainment mode is selected with the mode select controller 2, the flexible display 65 is in a raised state as illustrated in FIG. 7A, and an image output from the entertainment execution device 41 can be displayed on this expanded large screen.

The display device 6 of this example is not limited only to the display 63 provided on the front windshield W1, the display 64 provided on the interior mirror M, or the flexible display 65 illustrated in FIG. 6, and may further include other types of displays. FIGS. 8A and 8B are diagrams illustrating still another example of the display device 6 of the present embodiment, and are diagrams illustrating the rear of a vehicle including the rear seats of a minivan type automobile.

In this example, two side windshields W2 and W3 (there may be four in total, left and right) and a rear windshield W4 are configured of light control glass. The light control glass is glass that can be switched between a state in which light passes through the glass and it becomes transparent (light-transmitting mode) and a state in which the glass blocks light and it becomes opaque (light-blocking mode), and can be achieved, for example, by attaching a light-controlling film to the glass of the side windshields W2 and W3 and the rear windshield W4.

In the display device 6 of this example, the roof trim is provided with a projector PJ1 that projects an image onto the side windshield W2, a projector PJ2 that projects an image onto the side windshield W3, and a projector PJ3 that projects an image onto the rear windshield W4.

When the driving mode is selected with the mode select controller 2 described later and the automobile V is operated to be driven, the light control glass of the side windshields W2 and W3 and rear windshield W4 is set to the light-transmitting mode as illustrated in FIG. 8A, ensuring the occupants' visibility to the outside world. In contrast, when the entertainment mode is selected with the mode select controller 2 and images from the entertainment execution device 41 are displayed, the light control glass of the side windshields W2 and W3 and rear windshield W4 is set to the light-blocking mode as illustrated in FIG. 8B, and images are projected from the respective projectors PJ1, PJ2, and PJ3 onto the side windshields W2 and W3 and rear windshield W4. Although not illustrated, if the automobile V is equipped with a sunroof or moonroof, images may be projected onto such roof windshields with a similar configuration.

When displaying an image from the entertainment execution device 41 on the side windshield W2, W3 or rear windshield W4 illustrated in FIGS. 8A and 8B, a thin-film display composed of an organic light-emitting diode (OLED) may be provided on the side windshield W2, W3 or rear windshield W4 as substitute for the above-described light control glass and projectors PJ1 to PJ3.

As described above, the automobile V of the present embodiment may have the windshield W in a light-blocking mode, allowing the occupants to enjoy entertainment inside the automobile cabin. Therefore the driver may not notice a suspicious person approaching around the vehicle. For this reason, the automobile V of the present embodiment is provided with a monitoring device 17. FIG. 9 is a plan view illustrating an example of the monitoring device 17 of the present embodiment.

As illustrated in FIG. 9, the monitoring device 17 of the present embodiment includes five cameras 171 to 175 and four radar or sonar sensors. The cameras include a camera 171 that is provided in the center of the front bumper and captures the view in front of the vehicle, a camera 172 that is provided near the interior mirror and captures the view in front of the vehicle, a camera 173 that is provided in the right door mirror and captures the view to the right of the vehicle, a camera 174 that is provided in the left door mirror and captures the view to the left of the vehicle, and a camera 175 that is provided in the center of the rear bumper and captures the view to the rear of the vehicle. Respective imaging ranges of these cameras 171 to 175 are illustrated by broken lines in FIG. 9.

The radar or sonar sensors include a radar or sonar sensor 176 that is provided on the right-side portion of the front bumper and scans the right front of the vehicle, a radar or sonar sensor 177 that is provided on the left-side portion of the front bumper and scans the left front of the vehicle, a radar or sonar sensor 178 that is provided on the right-side portion of the rear bumper and scans the right rear of the vehicle, and a radar or sonar sensor 179 that is provided on the left-side portion of the rear bumper and scans the left rear of the vehicle. Respective scanning ranges of these radar or sonar sensors 176 to 179 are illustrated by dotted lines in FIG. 9.

The monitoring device 17 of the present embodiment reads the detection signals from these cameras 171 to 175 and radar or sonar sensors 176 to 179 and monitors whether there is an abnormality around the subject vehicle. The method of detecting an abnormality by the monitoring device 17 is not particularly limited, but an abnormality may be determined when a moving object such as an animal including a human or a vehicle is detected. In addition, as will be described in detail later, provided that the entertainment mode is selected, when the monitoring device 17 detects an abnormality around the subject vehicle, the mode select controller 2 controls the display device 6 to stop or halt the display of the images output from the entertainment execution device 41. This allows the driver to temporarily stop the entertainment and confirm the surroundings of the vehicle such as by visual check, thus preventing vandalism and theft of the vehicle.

Figure 2:
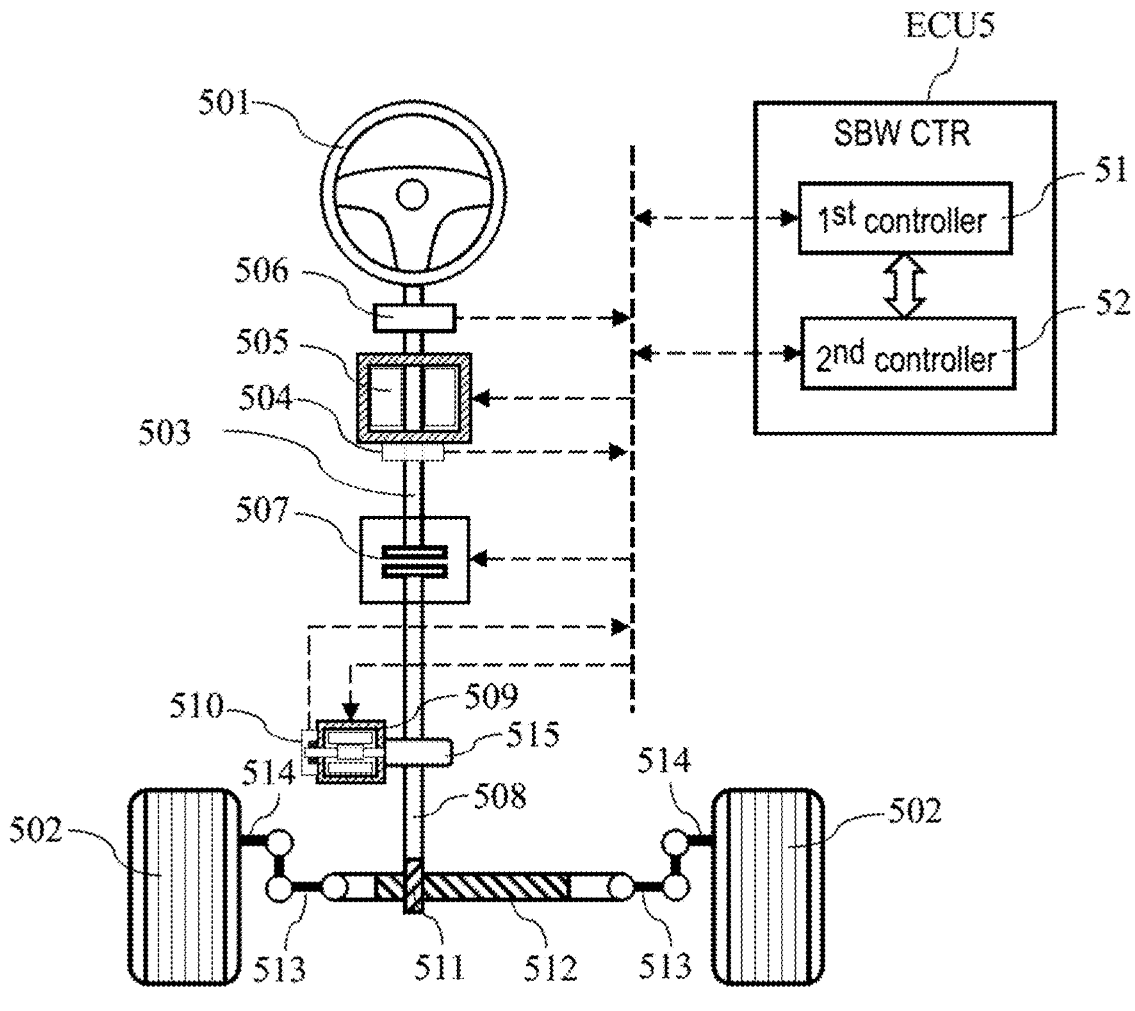
FIG. 2 is a schematic diagram illustrating an example of the steering device of FIG. 1.

The steering device 5 of the steering-by-wire type of the present embodiment will then be described. FIG. 2 is a schematic diagram illustrating an example of the steering device 5 of the present embodiment. The steering device 5 includes the steering wheel 501 which can be operated by the driver, the steerable wheels 502 which are the right and left front wheels, and a steering shaft 503. The steering wheel 501 is connected to the steering shaft 503 and is provided so that it can be mechanically separated from the steerable wheels 502 and 502. This steering shaft 503 is provided with a steering angle sensor 504, a reaction force motor 505, and a steering torque sensor 506.

The steering angle sensor 504 detects the steering angle of the steering wheel 501 and can be configured of an encoder or the like.

The reaction force motor 505 applies torque to the steering shaft 503 to provide a steering reaction force to the steering wheel 501. The steering reaction force refers to a force that acts in the opposite direction to the direction in which the driver steers the steering wheel 501. The reaction force motor 505 can be configured of a brushless motor or the like, and is driven according to a reaction force motor drive current that is output from a first control unit 51 of an SBW controller ECU 5, which will be described later.

The steering torque sensor 506 detects the steering torque transmitted from the steering wheel 501 to the steering shaft 503. The steering torque sensor 506 is configured to detect the steering torque by detecting the torsional angle displacement of a torsion bar, for example, with a potentiometer.

The steering device 5 of the present embodiment further includes a clutch 507, a pinion shaft 508, a steering motor 509, a steering motor angle sensor 510, a pinion gear 511, a rack shaft 512, tie rods 513, knuckle arms 514, and an SBW controller ECU 5.

The clutch 507 is interposed between the steering wheel 501 and the steerable wheels 502 and switches between an engaged state and a disengaged state according to a clutch command current from the SBW controller ECU 5. The clutch 507 of this example is composed of an electromagnetic clutch of a non-excitation engagement type, and when the electromagnetic coil is not excited, a roller meshes between the cam surface of an input shaft and the outer ring of an output shaft, for example, by a cam roller mechanism, and the input shaft and the output shaft are engaged to come into an engaged state. On the other hand, when the electromagnetic coil is excited, the attraction of an armature disengages the roller between the cam surface of the input shaft and the outer ring of the output shaft, and the input shaft and the output shaft are disconnected to come into a disengaged state. The clutch 507 of this example is in a disengaged state when the SBW system is operating normally, and is in an engaged state when any abnormality occurs in the SBW system.

In the disengaged state of the clutch 507 of this example, the torque transmission path between the steering wheel 501 and the steerable wheels 502 is mechanically separated, so that they come to a state in which the steering operation of the steering wheel 501 is not transmitted to the steerable wheels 502. On the other hand, when the clutch 507 is in the engaged state, the torque transmission path between the steering wheel 501 and the steerable wheels 502 is mechanically connected, so that they come to a state in which the steering operation of the steering wheel 501 is transmitted to the steerable wheels 502.

One end of the pinion shaft 508 is connected to the clutch 507, and the other end is provided with the pinion gear 511. The pinion gear 511 meshes with a rack gear provided between both ends of the rack shaft 512. Both ends of the rack shaft 512 are connected to the steerable wheels 502 via the tie rods 513 and the knuckle arms 514. This allows the steerable wheels 502 to turn via the tie rods 513 and knuckle arms 514 as the rack shaft 512 is displaced in the automobile width direction in response to the rotation of the pinion gear 511. As a result, the traveling direction of the automobile V is changed.

Like the reaction force motor 505, the steering motor 509 is composed of a brushless motor or the like, and is driven in response to the steering motor drive current output by the SBW controller ECU 5. The steering motor 509 is driven according to the steering motor drive current to output a turning torque for turning the steerable wheels 502. The tip of the output shaft of the steering motor 509 is provided with a worm while the pinion shaft 508 is provided with a worm wheel, and the rotation of the steering motor 509 is transmitted to the pinion shaft 508 by meshing of the worm gear 515 composed of the worm and the worm wheel.

The steering motor 509 is provided with the steering motor angle sensor 510. The steering motor angle sensor 510 detects the rotation angle of the steering motor 509. Here, the turning angle of the steerable wheels 502 is uniquely determined by the rotation angle of the steering motor 509, the gear ratio of the worm gear 515, and the gear ratio between the pinion gear 511 and the rack gear of the rack shaft 512, so the turning angle of the steerable wheels 502 can be obtained from the rotation angle of the steering motor 509. That is, the turning angle of the steerable wheels 502 can be obtained from the angle detected by the steering motor angle sensor 510.

The SBW controller ECU 5 is composed of a microcomputer including a processor, and reads a steering angle $\theta s$ of the steering wheel 501 detected by the steering angle sensor 504, a steering torque T detected by the steering torque sensor 506, and a turning angle $\theta r$ detected by the steering motor angle sensor 510. In addition to this, the SBW controller ECU 5 inputs a vehicle speed Vd and a yaw rate $\gamma$ from a controller (not illustrated) of another system. Then, when the clutch 507 is in the disengaged state, the SBW controller ECU 5 drives and controls the steering motor 509 according to the steering state of the steering wheel 501, and turns the steerable wheels 502. This allows the turning angle $\theta r$ of the steerable wheels 502 to coincide with the steering command angle according to the steering state of the steering wheel 501. At the same time, the SBW controller ECU 5 drives and controls the reaction force motor 505 according to the turning state of the steerable wheels 502, and applies the steering reaction force to the steering wheel 501. This applies the steering reaction force, which simulates the road reaction force, to the steering wheel 501. Thus, the SBW controller ECU 5 performs steering-by-wire control (also referred to as SBW control, hereinafter).

More specifically, the SBW controller ECU 5 is configured to include a first control unit 51 and a second control unit 52. The first control unit 51 outputs a first control amount corresponding to the steering reaction force to the steering wheel to the reaction force motor 505, and the second control unit 52 outputs a second control amount corresponding to the turning angle of the steerable wheels to the steering motor 509.

Although not particularly limited, in the SBW controller ECU 5 of the present embodiment, the first control unit 51 and the second control unit 52 each read detection values required for calculation, such as the steering angle $\theta s$ of the steering wheel 501 detected by the steering angle sensor 504, the steering torque T detected by the steering torque sensor 506, the turning angle $\theta r$ detected by the steering motor angle sensor 510, the vehicle speed Vd, and the yaw rate $\gamma$, and independently calculate, based on these detection values, the first control amount to be output to the reaction force motor 505 and the second control amount to be output to the steering motor 509.

Then, before outputting to the reaction force motor 505 and the steering motor 509, a determination is made whether or not the first control amount and the second control amount calculated by the first control unit 51 match the first control amount and the second control amount calculated by the second control unit 52, and when they do not match, a determination is made that some abnormality occurs in the steering device 5, and a signal to that effect is output.

Although details will be described later, in the driving mode in which the automobile V is driven, the first control unit 51 outputs the first control amount corresponding to the steering reaction force applied to the steering wheel 501 to the reaction force motor 505, and the second control unit 52 outputs the second control amount corresponding to the turning angle of the steerable wheels 502 to the steering motor 509. On the other hand, in the entertainment mode in which the automobile V is stopped and the entertainment execution device 41 is operated to enjoy a game or the like, the first control unit 51 outputs the first control amount corresponding to the steering reaction force applied to the steering wheel 501 to the reaction force motor 505, while the second control unit 52 outputs 0 to the steering motor 509 as a control amount that does not change the turning angle of the steerable wheels 502. This makes it possible to stop turning the steerable wheels 502 even when the steering wheel 501 is rotated, while feeling the steering reaction force corresponding to the content of the game at the steering wheel 501.

Referring again to FIG. 1, the automobile V of the present embodiment is equipped with an IVI controller 4 including the entertainment execution device 41. The IVI controller 4 of this example means an in-vehicle infotainment device, which is composed of a microcomputer including a processor, and is a system that achieves provision of information and provision of entertainment. The IVI controller 4 of this example uses a car navigation device as having an information provision function to guide a travel route and display road traffic information. The IVI controller 4 of this example also uses an audio device 8 including a TV tuner and a display device 6 as having an entertainment provision function to provide music, movies, television programs, etc. In particular, the IVI controller 4 of this example is equipped with the entertainment execution device 41, which executes racing games and other entertainment software, communicates with radio control toys and other radio control equipment, and plays back movies and other video content on the display device 6 and with the audio device 8.

When game software is executed using the entertainment execution device 41, execution of the software content can be performed, for example, by connecting to a cloud server CS. When movies or other video content is played back using the entertainment execution device 41, the video content can be downloaded, for example, by connecting to the cloud server CS. When movies or other video content is played back, a disk medium such as a DVD or BD that stores the video content can be played back using the audio device 8 and displayed on the display device 6 of the present embodiment.

Figure 3:
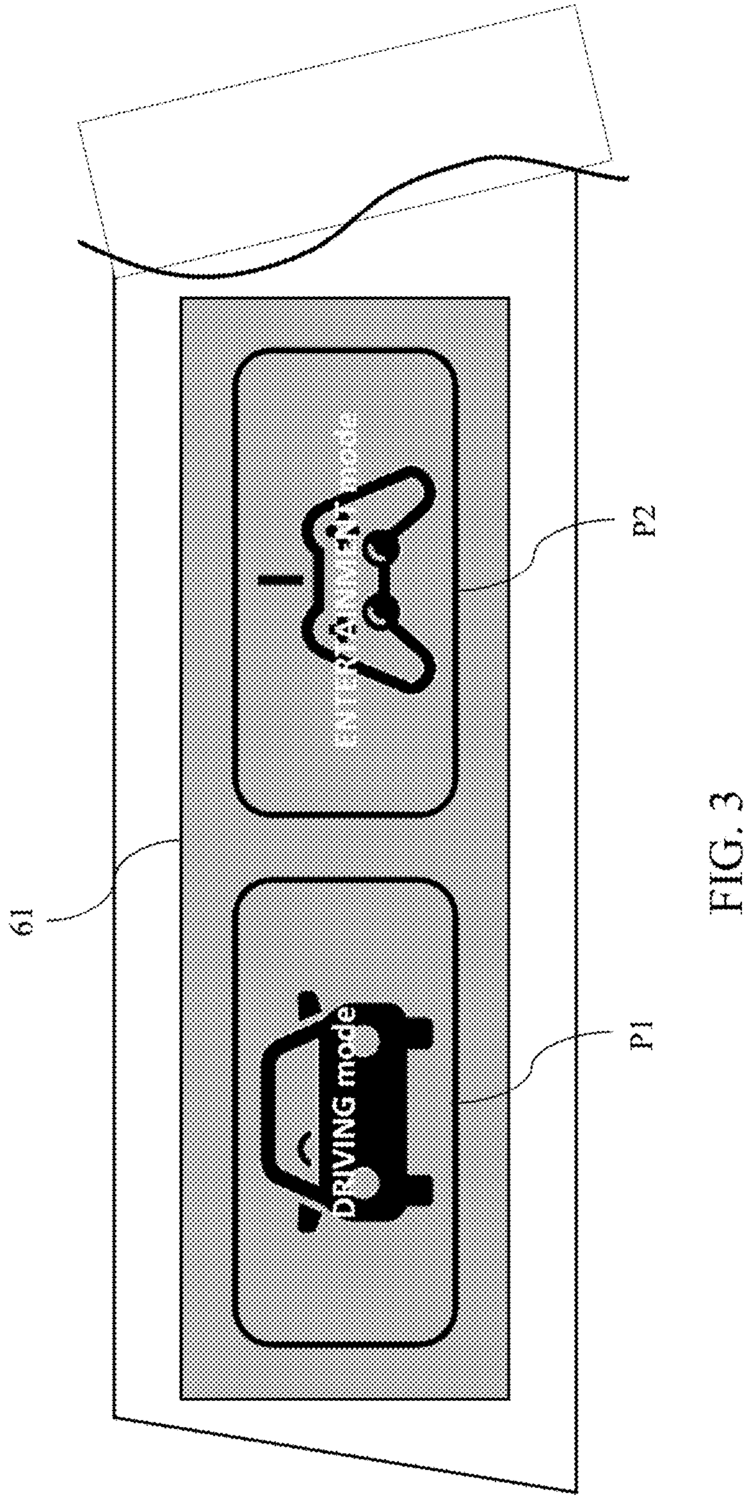
FIG. 3 is a front view illustrating an example of a display for allowing a driver to select between an entertainment mode and a driving mode.

The automobile V of the present embodiment includes a mode select controller 2 that is composed of a microcomputer including a processor and that enables selection between the entertainment mode for operating the entertainment execution device 41 and the driving mode for driving the automobile V. The mode select controller 2 of this example includes a selection switch that allows the driver to select between the entertainment mode and the driving mode when a main switch 3 for starting the automobile V is turned on. FIG. 3 is a front view illustrating an example of the selection switch displayed on a center display 61 of the instrument panel for allowing the driver to select between the entertainment mode and the driving mode. When the center display 61 is composed of a liquid crystal touch panel or the like, the driver can select the desired mode by touching either a portion P1 indicating the driving mode on the left or a portion P2 indicating the entertainment mode on the right. The main switch 3 for starting the automobile V represents an ignition switch in the automobile V equipped with an internal combustion engine or represents a power switch in an electric car or a hybrid car.

Incidentally, the mode select controller 2 of this example prompts the driver to select between the entertainment mode and the driving mode each time the main switch 3 for starting the automobile V is turned on, so drivers who are not interested in the entertainment mode may feel this selection operation bothersome. For this reason, it is preferred that the mode select controller 2 of this example should be set as one of the so-called optional items when the automobile V is manufactured in response to the driver's request, and installed only in the automobile V for a purchaser who requires the entertainment mode.

The mode select controller 2 of this example not only prompts the driver to select between the entertainment mode and the driving mode when starting the automobile, but also has a function of controlling the steering device 5 so that, when the entertainment mode is selected, the steerable wheels 502 are not turned even when the steering wheel 501 is operated. This will be described later.

In addition, the mode select controller 2 of this example sets the maximum rotation angle of the steering wheel 501 when the entertainment mode is selected to an angle smaller than the maximum rotation angle of the steering wheel 501 when the driving mode is selected. Provided that the magnitude of the rotation angle of the steerable wheels 502 relative to the rotation angle of the steering wheel 501 is defined as an actual steering angle of the steerable wheels, the mode select controller 2 sets the actual steering angle of the steerable wheels when the entertainment mode is selected to a larger angle than the actual steering angle of the steerable wheels when the driving mode is selected. This eliminates the need to turn the steering wheel 501 widely when playing games or operating a radio control car, and allows for a quick and agile turning operation with a small operating angle.

As illustrated in FIG. 1, the automobile V of the present embodiment includes a body control module 1. The body control module 1 of this example is an electronic control unit that comprehensively controls the functions of the automobile body as a whole, and is composed of a microcomputer including a processor. Like the typical automobiles, the automobile V of the present embodiment also includes a display device 6, an air conditioner 7, an audio device 8 including speakers, a radio tuner, a TV tuner, and a CD/DVD/BD player, a seat adjuster 9 that adjusts the position and posture of the seat using an actuator, an air suspension device 10 that adjusts the posture of the automobile body, a steering switch 11 provided on the steering wheel 501, a gear shift lever 12 also called a floor shift lever, a paddle shift 13 provided on the steering wheel 501, an accelerator pedal 14, a brake pedal 15, and a monitoring device 17. In addition to the above, the automobile V includes lighting devices inside and outside the automobile, door locking/unlocking devices, door window glass raising/lowering devices, door mirrors, interior mirrors, windshield wipers, etc.

In the automobile V of the present embodiment, a communication path is constructed using an in-vehicle communication network (in-vehicle LAN) standard such as CSMA/CA multiplex communication (CAN: Controller Area Network) or FlexRay, and controllers including the body control module 1 are connected to each other so that they can communicate with each other via a communication line 16.

When the driving mode is selected by the mode select controller 2, a notification to that effect is output from the mode select controller 2 to the body control module 1, which controls each controller illustrated in FIG. 1 in the normal driving mode.

Figure 4:
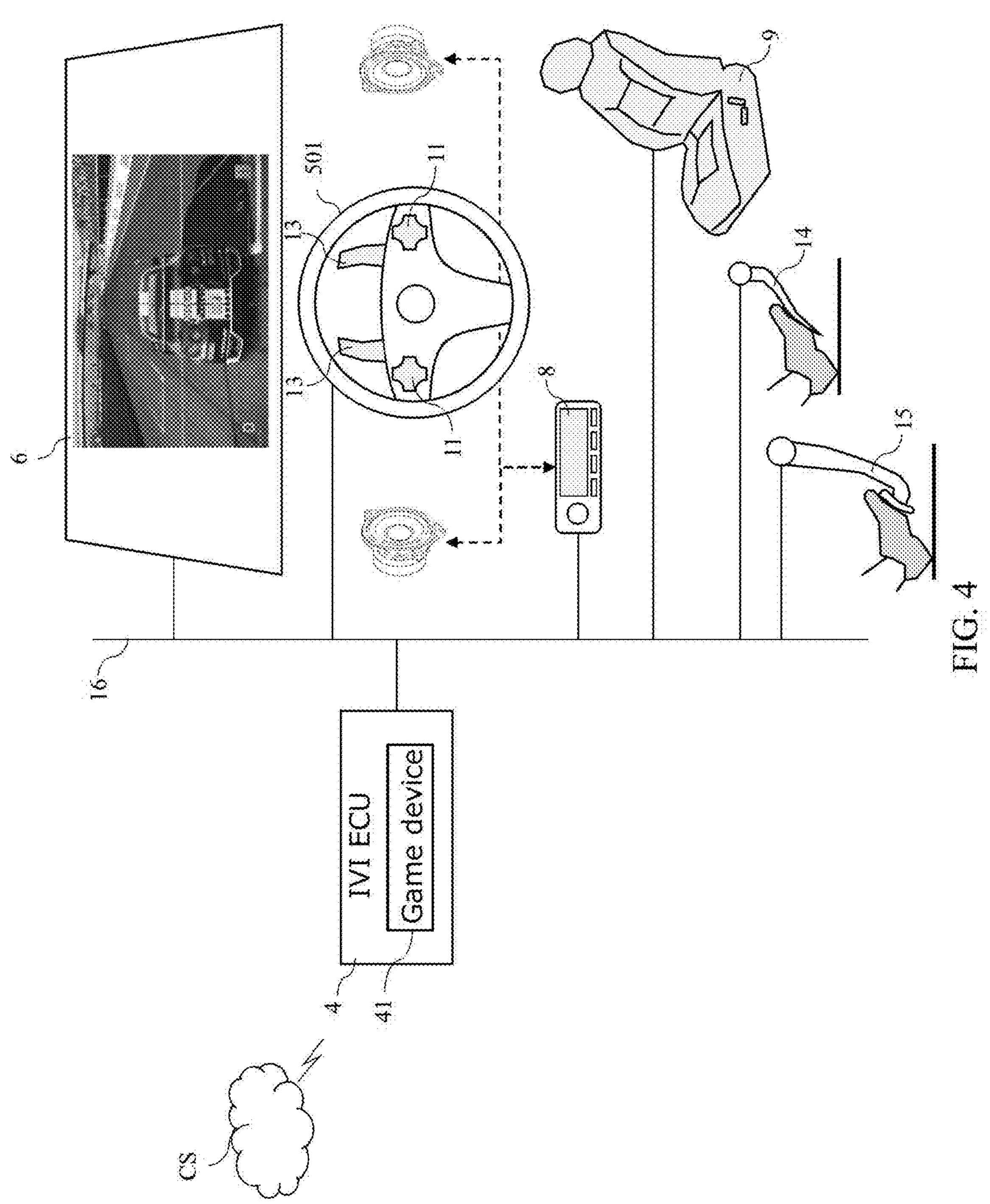
FIG. 4 is a schematic diagram illustrating a situation in which a car racing game is played using the entertainment execution device of FIG. 1.

In contrast, when the entertainment mode is selected by the mode select controller 2, a notification to that effect is output from the mode select controller 2 to the body control module 1, which controls each controller according to the entertainment content executed by the entertainment execution device 41. For example, with reference to the case of playing a car racing game using the entertainment execution device 41, an example of controlling various devices of the automobile V will be described. FIG. 4 is a schematic diagram illustrating a situation in which a car racing game is played using the entertainment execution device 41.

In the car racing game as illustrated in FIG. 4, the game software is displayed on the display device 6, and the driver operates the steering wheel 501, accelerator pedal 14, and brake pedal 15 while looking at the screen. In addition, when there is any operation input other than acceleration/deceleration and turning of the racing car, the operation input is made using various buttons on the steering switch 11, the paddle shift 13, the gear shift lever 12, etc. The operation amounts of operation signals input from these steering wheel 501, accelerator pedal 14, brake pedal 15, various buttons on the steering switch 11, the paddle shift 13, and the gear shift lever 12 are output to the entertainment execution device 41 via the communication line 16 and the body control module 1, and are input to the game software as the control amounts of respective operations defined by the game software. This allows the racing game to be played using the steering wheel 501 of the car V, etc.

On the other hand, when playing a car racing game, the image is displayed on the display device 6 as described above, but the sound output in the racing game is output from the speakers using the audio device 8. Additionally or alternatively, in order to enhance the sense of realism in the racing game, the actuator of the seat adjuster 9 may be controlled to give vibration to the driver's seat. Likewise, the actuator of the air suspension device may be controlled to change the posture of the automobile body to give a feeling of cornering or acceleration/deceleration. Furthermore, when enjoying a role-playing game (RPG), the air conditioner 7 may be operated according to the environment in the game to change the temperature inside the automobile cabin, thereby giving a sense of realism. Thus, the sense of realism of the entertainment can be further enhanced by controlling at least one of the display device 6, the air conditioner 7, the audio device 8, the seat adjuster 9, and the air suspension device 10 according to the control signal from the entertainment execution device 41.

Figure 5:
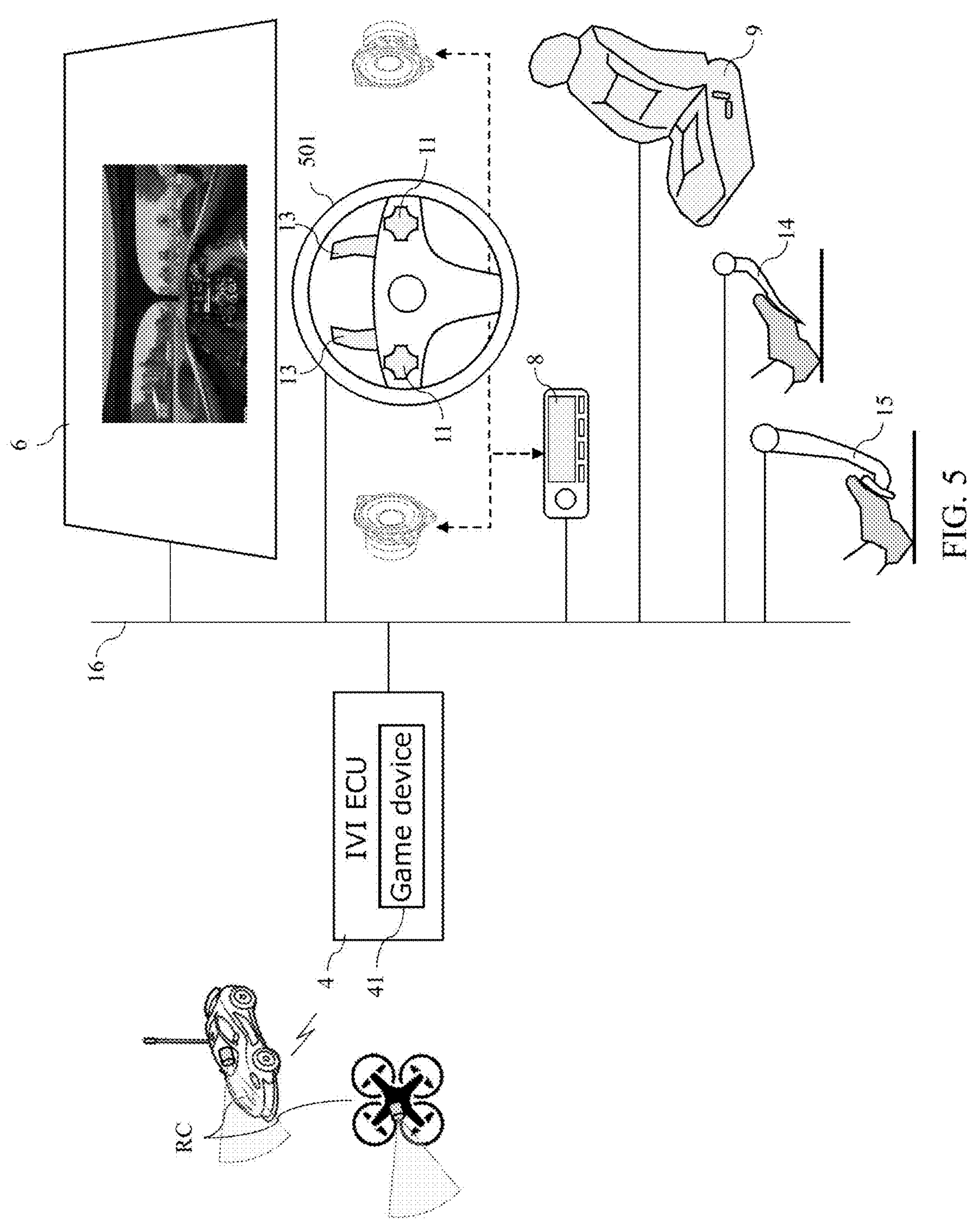
FIG. 5 is a schematic diagram illustrating a situation in which a radio control toy car is operated using the entertainment execution device of FIG. 1.

The entertainment execution device 41 of the present embodiment is used not only to execute games and other entertainment software, but also to remotely operate radio control cars or drones by communicating with radio control equipment RC. FIG. 5 is a schematic diagram illustrating a situation in which the radio control equipment RC such as a radio control car toy or a radio control drone toy is operated using the entertainment execution device 41.

In the radio control equipment RC such as a radio control car or drone as illustrated in FIG. 5, an image from a CCD camera mounted on the radio control car or drone is displayed on the display device 6, and the driver operates the steering wheel 501, accelerator pedal 14, and/or brake pedal 15 while looking at this screen. In addition, when there is any operation input other than acceleration/deceleration and turning of the radio control car or drone, the operation input is made using various buttons of the steering switch 11, the paddle shift 13, the gear shift lever 12, etc. The operation amounts of operation signals input from these steering wheel 501, accelerator pedal 14, brake pedal 15, various buttons of the steering switch 11, the paddle shift 13, and the gear shift lever 12 are output to the entertainment execution device 41 via the communication line 16 and the body control module 1, and are input to the radio control equipment RC as the control amounts of respective operations defined in the radio control equipment RC. This allows the radio control car or a radio control drone to be operated using the steering wheel 501 of the car V, etc.

On the other hand, when operating the radio control car or radio control drone, the camera image is displayed on the display device 6 as described above, but the sound output from the radio control car or radio control drone is output from the speakers using the audio device 8. Additionally or alternatively, in order to enhance the sense of realism of the radio control car or radio control drone, the actuator of the seat adjuster 9 may be controlled to give vibration to the driver's seat. Likewise, the actuator of the air suspension device may be controlled to change the posture of the automobile body to give a feeling of cornering or acceleration/deceleration. Furthermore, the air conditioner 7 may be operated according to the environment during the driving or flight to change the temperature inside the automobile cabin, thereby giving a sense of realism. Thus, the sense of realism of the entertainment can be further enhanced by controlling at least one of the display device 6, the air conditioner 7, the audio device 8, the seat adjuster 9, and the air suspension device 10 according to the control signal from the entertainment execution device 41.

The operation of the automobile V according to the present embodiment will now be described. FIG. 10 is a flowchart illustrating the information processing flow executed by the automobile V according to the present embodiment. First, in step S1, when the driver turns on the main switch 3 of the automobile V, the internal combustion engine starts in the case of an automobile equipped with an internal combustion engine, or the power supply from the main power source to the electric system starts in the case of an electric automobile. In subsequent step S2, control by the SBW controller ECU 5 is started, and when a determination is made that there is no disadvantage in the steering device 5, the engagement of the clutch 507 is released to come to a disengaged state in step S3.

Then, in subsequent step S4, an image for selecting between the driving mode and the entertainment mode as illustrated in FIG. 3 is displayed on the center display 61 of the display device 6, and in step S5, when the driving mode is desired, the portion P1 is touched, while when the entertainment mode is desired, the portion P2 is touched. When the portion P1 indicating the driving mode is touched, the process proceeds to step S6, whereas when the portion P2 indicating the entertainment mode is touched, the process proceeds to step S7.

In step S8, when the driving mode is selected, the driving mode continues until the driver turns off the main switch 3 of the automobile V, while when the entertainment mode is selected, the entertainment mode continues until the driver turns off the main switch 3 of the automobile V. When the driver turns off the main switch 3, the internal combustion engine stops in the case of an automobile equipped with an internal combustion engine, or the power supply from the main power source to the electric system stops in the case of an electric automobile; therefore, the clutch 507 is engaged in step S9, changing the current disengaged state to the engaged state.

The operation of the driving mode in step S6 will then be described. FIGS. 11A and 11B are flowcharts illustrating a subroutine when the driving mode in step S6 of FIG. 10 is selected. The calculation processing illustrated in FIGS. 11A and 11B is repeated at a predetermined time interval (e.g., at intervals of several msec). When the driver selects the driving mode in step S5 of FIG. 10, the process proceeds to step S601 of FIG. 11A. In step S601, the detection signal from the steering angle sensor 504 is read out to detect the steering angle of the steering wheel 501.

When the steering angle of the steering wheel 501 is detected in step S601, in subsequent steps S602 and S603, the first control unit 51 and second control unit 52 of the SBW controller ECU 5 each read the steering angle $\theta s$ of the steering wheel 501 detected by the steering angle sensor 504, as well as the steering torque T detected by the steering torque sensor 506, the vehicle speed Vd, the yaw rate $\gamma$, and other detection values required for calculation, and based on these, calculate the second control amount to be output to the steering motor 509 independently of each other. This second control amount is obtained as an output control value to the steering motor 509 corresponding to the turning angle of the steerable wheels 502. Here, it is assumed that the second control amount calculated by the first control unit 51 is $\theta 1$ and the second control amount calculated by the second control unit 52 is $\theta 2$. Although not particularly limited in the automobile according to the present invention, the first control unit 51 and the second control unit 52 execute the same calculation as in the present embodiment, and by checking the agreement of the calculation results, an abnormality in the related equipment can be found.

In step S604, the agreement between the second control amounts $\theta 1$ and $\theta 2$ calculated in steps S602 and S603, respectively, is determined. This determination of agreement may involve a certain acceptable range with consideration for calculation errors, etc. When the second control amounts $\theta 1$ and $\theta 2$ match ($\theta 1=\theta 2$), the process proceeds to step S608 of FIG. 11B, in which the steering control in normal cases is executed. On the other hand, when the second control amounts $\theta 1$ and $\theta 2$ do not match ($\theta 1 \neq \theta 2$), the process proceeds to step S605, in which a warning light provided on the meter display 62 of the instrument panel is turned on to indicate that an abnormality is detected.

Subsequently, in step S606, the excitation of the electromagnetic coil of the clutch 507 is stopped, and the current disengaged state is changed to the engaged state. Alternatively, when the steering device 5 is preliminarily configured as a redundant system provided with multiple sensors, controllers, and motors, the redundant control may be initiated to activate the backup system.

Subsequently, the clutch 507 is engaged and the steering torque of the steering wheel 501 is transmitted to the pinion shaft 508, so in step S607, the process transitions to EPS control to use the steering motor 509 as an actuator of the electric power steering that assists the driver's steering operation. After that, the electric power steering control is performed with the clutch 507 engaged.

Referring again to step S604 of FIG. 11A, when the second control amounts $\theta 1$ and $\theta 2$ are the same ($\theta 1=\theta 2$), the process proceeds to step S608 of FIG. 11B. In steps S608 to S610 of FIG. 11B, the second control unit 52 outputs the second control amount θ2 obtained by calculation to the steering motor 509 and executes angle servo control to turn the steerable wheels 502 via the pinion shaft 508, pinion gear 511, rack shaft 512, etc. This allows the steerable wheels 502 to turn in response to the amount of operation of the steering wheel 501 by the driver, and the automobile V turns in the desired direction.

In step S611, a determination is made whether or not there is an input from the road surface to the steering gear via the steerable wheels 502. When there is no input from the road surface, there is no need to apply a reaction force to the steering wheel 501, and the subsequent processing is concluded.

On the other hand, when there is an input from the road surface, the process proceeds to steps S612 and S613, in which the first control unit 51 and second control unit 52 of the SBW controller ECU 5 each read the steering angle θs of the steering wheel 501 detected by the steering angle sensor 504, as well as the turning angle θr detected by the steering motor angle sensor 510, the steering torque T detected by the steering torque sensor 506, the vehicle speed Vd, the yaw rate γ, and other detection values required for calculation, and based on these, calculate the first control amount to be output to the reaction force motor 505 independently of each other. This first control amount is obtained as an output control value to the reaction force motor 505 corresponding to the steering reaction torque for the steering wheel 501. Here, it is assumed that the first control amount calculated by the first control unit 51 is F1 and the first control amount calculated by the second control unit 52 is F2. Although not particularly limited in the automobile according to the present invention, the first control unit 51 and the second control unit 52 execute the same calculation as in the present embodiment, and by checking the agreement of the calculation results, an abnormality in the related equipment can be found.

In step S614, the agreement between the first control amounts F1 and F2 calculated in steps S612 and S613, respectively, is determined. This determination of agreement may involve a certain acceptable range with consideration for calculation errors, etc. When the first control amounts F1 and F2 match (F1=F2), the process proceeds to step S615, in which the reaction force control by the first control unit in the normal case is executed. On the other hand, when the first control amounts F1 and F2 do not match (F1≠F2), the process proceeds to step S617, in which a warning light provided on the meter display 62 of the instrument panel is turned on to indicate that an abnormality is detected.

Subsequently, in step S618, F=0 is output as the first control amount to the reaction force motor 505. That is, in subsequent step S619, the clutch 507 is engaged to apply the intrinsic mechanical reaction force to the steering wheel 501, or instead, redundant control is initiated, so here the first control amount output to the reaction force motor 505 is set to F=0.

Subsequently, in step S619, the excitation of the electromagnetic coil of the clutch 507 is stopped, and the current disengaged state is changed to the engaged state. Alternatively, when the steering device 5 is preliminarily configured as a redundant system provided with multiple sensors, controllers, and motors, the redundant control may be initiated to activate the backup system.

Subsequently, the clutch 507 is engaged and the steering torque of the steering wheel 501 is transmitted to the pinion shaft 508, so in step S620, the process transitions to EPS control to use the steering motor 509 as an actuator of the electric power steering that assists the driver's steering operation. After that, the electric power steering control is performed with the clutch 507 engaged.

Referring again to step S614, when the first control amounts F1 and F2 match (F1=F2), the process proceeds to step S615. In steps S615 and S616, the first control amount F1 obtained by calculation is output to the reaction force motor 505, and a pseudo force equivalent to the steering reaction force input from the road surface is applied to the steering wheel 501. This allows the driver to feel the reaction force in response to the driving operation.

The operation of the entertainment mode in step S7 of FIG. 10 will then be described. FIG. 12 is a flowchart illustrating a subroutine when the entertainment mode in step S7 of FIG. 10 is selected. When the driver selects the entertainment mode in step S5 of FIG. 10, the process proceeds to step S71 of FIG. 12. In step S71, the entertainment execution device 41 is activated, and in subsequent step S72, an initial screen and a selection screen are displayed on the display device 6. Since the entertainment execution device 41 of the present embodiment has a game mode for enjoying games, a radio control mode for enjoying radio control equipment, and a video mode for watching videos such as movies, in subsequent step S75, the driver is prompted to select which of the game mode, the radio control mode, or the video mode he/she wishes to execute.

When the initial screen or selection screen is displayed on the screen of the display device 6 in step S72, the monitoring device 17 is activated in step S73 and executes the monitoring mode in step S74. FIG. 13 is a flow chart illustrating the subroutine of the monitoring mode in step S74.

First, in step S741, the detection signals from the cameras 171 to 175 and the radar or sonar sensors 176 to 179 provided on a vehicle body B are read at a predetermined time interval, and the surroundings of the vehicle are monitored for abnormalities. For example, if a moving object such as an animal or a vehicle is detected and a determination is made that this is an abnormality, the process proceeds to step S742, in which the display of the images output from the entertainment execution device 41 to the display device 6 is stopped. This allows the entertainment execution device 41 to temporarily stop in step S743. The driver confirms the surroundings of the vehicle, such as by visual check, thereby confirming the presence of absence of an abnormality. When no abnormality is found, the redisplay of the images on the display device 6 is permitted (OK) in step S744, but the display of the images will continue to be stopped unless the abnormality is released.

When the redisplay of the images on the display device 6 is permitted (OK) in step S744, the entertainment execution device 41 is reactivated in step S745, and the images are displayed on the display device 6 in step S746. The monitoring mode illustrated in FIG. 13 continue as long as any of the game mode, radio control mode, and video mode in FIG. 12 is being executed.

Referring again to step S75 of FIG. 12, when the driver selects the game mode, the process proceeds to step S76, when the driver selects the radio control mode, the process proceeds to step S77, and when the driver selects the video mode, the process proceeds to step S78. Details of the game mode in step S76, radio control mode in step S77, and video mode in step S78 will be described later. In subsequent step S79, when the game mode of step S76 is selected, a determination is made whether or not the game has been finished, when the radio control mode of step S77 is selected, a determination is made whether or not the operation of the radio control equipment has been finished, when the video mode of step S78 is selected, a determination is made whether or not the playback of the video content has been finished, and when it has been finished, the process is concluded.

The operation when the driver selects the game mode in step S75 of FIG. 12 will then be described. FIGS. 14A and 14B are flowcharts illustrating a subroutine for the game mode in step S76 of FIG. 12. In the process flow of FIG. 14A, one routine of calculation is executed when the game mode is selected, and the process flow of FIG. 14B is executed repeatedly at a predetermined time interval (e.g., at intervals of several msec) after the game control is put into a standby state in step S769 of FIG. 14A.

First, when the driver selects the game mode, the IVI controller 4 starts the integrated control of the entertainment execution device 41 in step S761 of FIG. 14A, and the entertainment execution device 41 activates the application software for executing the game. Then, in step S762, the entertainment execution device 41 accesses a cloud server CS, connects to the cloud game platform, and activates the desired game software, here a racing car game. In step S763, the display device 6 for displaying the game images is selected from among the display 63 provided on the front windshield W1, the display 64 provided on the interior mirror M, and the windshield W configured of light control glass.

When the driver selects the display 63 provided on the front windshield W1, the process proceeds to step S764, in which the entertainment execution device 41 displays the content of the selected racing car game on the display 63 provided on the front windshield W1. Likewise, when the driver selects the display 64 provided on the interior mirror M, the process proceeds to step S765, in which the entertainment execution device 41 displays the content of the selected racing car game on the display 64 provided on the interior mirror M. Likewise, when the driver selects the windshield W configured of light control glass, the process proceeds to step S766, in which the light control glass is set to the light-blocking mode, and the process then proceeds to step S767, in which the entertainment execution device 41 displays the content of the selected racing car game on the windshield W configured of light control glass.

In step S768, the second control unit 52 outputs θ3=0 as the turning angle to the steering motor 509. Here, when the main switch 3 of the automobile V is turned on in step S1 of FIG. 10 and then the entertainment mode is selected in step S7, the SBW control by the SBW controller ECU 5 is started in the previous step S2, and the clutch 507 is in a disengaged state in step S3. Accordingly, when the steering wheel 501 is operated to operate the racing car in the racing car game, the steerable wheels 502 are also turned by the SBW control. In the present embodiment, in order to prevent the steerable wheels 502 of the automobile V from turning when the game is executed, in step S768 before the game is started, the second control unit 52 outputs θ3=0 as the turning angle to the steering motor 509.

In step S769, the game control is in a standby state in which preparations for game control are complete, so a game start button and the like are displayed on the display device 6.

When the game control is in a standby state in step S769 and the game is started, the process proceeds to step S7601 of FIG. 14B. Around the same time, images and BGM of the game content are output from the cloud game platform of the cloud server CS, so the entertainment execution device 41 to which these are input displays images of the content on the selected display device 6 via the body control module 1, and outputs BGM from the speakers using the audio device 8. When the racing game actually starts, the driver drives the racing car in the game by operating the accelerator pedal 14 and the brake pedal 15 while operating the steering wheel 501. In step S7401, the detection signal from the steering angle sensor 504 is read out to detect the steering angle of the steering wheel 501.

When the steering angle of the steering wheel 501 is detected in step S7601, in subsequent steps S7602 and S7603, the first control unit 51 and second control unit 52 of the SBW controller ECU 5 each read the steering angle θs of the steering wheel 501 detected by the steering angle sensor 504, as well as the steering torque T detected by the steering torque sensor 506, the vehicle speed Vd, the yaw rate γ, and other detection values required for calculation, and based on these, calculate the second control amount to be output to the steering motor 509 independently of each other. Note that since the automobile V is in a state of being stopped during execution of the entertainment mode, the detection values such as the vehicle speed Vd and the yaw rate γ are those in the stopped state.

Note, however, that the second control amount in the game mode is obtained as an output control value corresponding to the turning angle of the steerable wheels of the racing car in the game content, rather than corresponding to the steerable wheels 502 of the automobile V. Here, it is assumed that the second control amount calculated by the first control unit 51 is θ1 and the second control amount calculated by the second control unit 52 is θ2. Although not particularly limited in the automobile according to the present invention, also in the game mode, the first control unit 51 and the second control unit 52 execute the same calculation as in the present embodiment, and by checking the agreement of the calculation results, the advantage is obtained that an abnormality in the related equipment can be found before driving the automobile V next time.

In step S7604, the agreement between the second control amounts θ1 and θ2 calculated in steps S7602 and S7603, respectively, is determined. This determination of agreement may involve a certain acceptable range with consideration for calculation errors, etc. When the second control amounts θ1 and θ2 match (θ1=θ2), the process proceeds to step S7606, in which the steering control in normal cases is executed. On the other hand, when the second control amounts θ1 and θ2 do not match (θ1≠θ2), the process proceeds to step S7605, in which a warning light provided on the meter display 62 of the instrument panel B1 is turned on to indicate that an abnormality is detected, and the game control is then finished.

Referring again to step S7604, when the second control amounts θ1 and θ2 are the same (θ1=θ2), the process proceeds to step S7606. In steps S7606 and S7607, the second control unit 52 outputs the second control amount θ2 obtained by calculation to the cloud game platform of the cloud server CS via the body control module 1 and the entertainment execution device 41, and turns the steerable wheels of the racing car. This allows the steerable wheels of the racing car to turn in response to the amount of operation of the steering wheel 501 by the driver, and the racing car in the game turns in the desired direction.

Subsequently, in step S7608, the cloud game platform of the cloud server CS determines whether or not there is an input from the road surface in the game to the steering gear via the steerable wheels of the racing car. When there is no input from the road surface, there is no need to apply a reaction force to the steering wheel 501, and the subsequent processing is terminated.

On the other hand, when there is an input from the road surface, the process proceeds to step S7609, in which the cloud game platform of the cloud server CS converts and calculates control signals related to the steering reaction force based on various detection values during the game into the first control amount F1 to be output to the reaction force motor 505 of the automobile V. This first control amount F1 is obtained as an output control value to the reaction force motor 505 corresponding to the steering reaction torque for the steering wheel 501.

In steps S7610 to S7612, the first control amount F1 output from the cloud game platform of the cloud server CS is output to the first control unit 51, and the first control unit 51, to which the first control amount F1 is input, outputs this to the reaction force motor 505. Through this operation, a pseudo force equivalent to the steering reaction force input from the road surface is applied to the steering wheel 501, and the driver can thus feel the reaction force in response to the driving operation.

Although not illustrated in FIG. 14B, in addition to reflecting the reaction force, which the racing car receives from the road surface, to the steering wheel 501 of the automobile V, the impact and acceleration/deceleration force which the racing car receives (gravity G which the driver receives) may be detected by the cloud game platform of the cloud server CS and output from the cloud game platform to the entertainment execution device 41, and the actuator of the seat adjuster 9 may be controlled to impart vibration to the driver's seat, or the actuator of the air suspension device may be controlled to change the posture of the automobile body, thereby giving a feeling of cornering or acceleration/deceleration.

The operation when the driver selects the radio control mode in step S75 of FIG. 12 will then be described. FIGS. 15A and 15B are flowcharts illustrating a subroutine for the radio control mode in step S77 of FIG. 12. In the process flow of FIG. 15A, one routine of calculation is executed when the radio control mode is selected, and the process flow of FIG. 15B is executed repeatedly at a predetermined time interval (e.g., at intervals of several msec) after the radio control is put into a standby state in step S779 of FIG. 15A.

First, when the driver selects the radio control mode, the IVI controller 4 starts the integrated control of the entertainment execution device 41 in step S771 of FIG. 15A, and the entertainment execution device 41 activates the application software for executing the radio control operation. Then, in step S772, the entertainment execution device 41 accesses a cloud server CS, connects to the cloud game platform, and connects to the desired radio control equipment RC, here a radio control car.

In step S773, the display device 6 for displaying the game images is selected from among the display 63 provided on the front windshield W1, the display 64 provided on the interior mirror M, and the windshield W configured of light control glass.

When the driver selects the display 63 provided on the front windshield W1, the process proceeds to step S774, in which the entertainment execution device 41 displays the content of the selected racing car game on the display 63 provided on the front windshield W1. Likewise, when the driver selects the display 64 provided on the interior mirror M, the process proceeds to step S775, in which the entertainment execution device 41 displays the content of the selected racing car game on the display 64 provided on the interior mirror M. Likewise, when the driver selects the windshield W configured of light control glass, the process proceeds to step S776, in which the light control glass is set to the light-blocking mode, and the process then proceeds to step S777, in which the entertainment execution device 41 displays the content of the selected racing car game on the windshield W configured of light control glass. Thus, the entertainment execution device 41 displays, on the selected display device 6, the image captured by the camera mounted on the selected radio-controlled car.

In step S778, the second control unit 52 outputs θ3=0 as the steering angle to the steering motor 509. Here, when the main switch 3 of the automobile V is turned on in step S1 of FIG. 10 and then the entertainment mode is selected in step S7, the SBW control by the SBW controller ECU 5 is started in the previous step S2, and the clutch 507 is in a disengaged state in step S3. Accordingly, when the steering wheel 501 is operated to operate the radio control car in the racing car game, the steerable wheels 502 are also turned by the SBW control. In the present embodiment, in order to prevent the steerable wheels 502 of the automobile V from turning when the radio control operation is executed, in step S778 before the game is started, the second control unit 52 outputs θ3=0 as the turning angle to the steering motor 509.

In step S779, the radio control operation is in a standby state in which preparations for control of radio control operation are complete, so a radio control operation start button and the like are displayed on the display device 6.

When the control of radio control operation is in a standby state in step S779 and the radio control operation is started, the process proceeds to step S7701 of FIG. 15B. Around the same time, the radio control equipment RC outputs images captured by the camera and sounds collected by the microphone, so the entertainment execution device 41 to which these are input displays the images captured by the camera on the selected display device 6 via the body control module 1, and outputs the collected sounds from the speakers using the audio device 8. When the remote control of the radio control car actually starts, the driver drives the radio control car, which is being remotely controlled, by operating the accelerator pedal 14 and the brake pedal 15 while operating the steering wheel 501. In step S7501, the detection signal from the steering angle sensor 504 is read out to detect the steering angle of the steering wheel 501.

When the steering angle of the steering wheel 501 is detected in step S7701, in subsequent steps S7702 and S7703, the first control unit 51 and second control unit 52 of the SBW controller ECU 5 each read the steering angle θs of the steering wheel 501 detected by the steering angle sensor 504, as well as the steering torque T detected by the steering torque sensor 506, the vehicle speed Vd, the yaw rate γ, and other detection values required for calculation, and based on these, calculate the second control amount to be output to the steering motor 509 independently of each other. Note that since the automobile V is in a state of being stopped during execution of the entertainment mode, the detection values such as the vehicle speed Vd and the yaw rate γ are those in the stopped state.

Note, however, that the second control amount in the radio control mode is obtained as an output control value corresponding to the turning angle of the steerable wheels of the operated radio control car, rather than corresponding to the steerable wheels 502 of the automobile V. Here, it is assumed that the second control amount calculated by the first control unit 51 is θ1 and the second control amount calculated by the second control unit 52 is θ2. Although not particularly limited in the automobile according to the present invention, also in the radio control mode, the first control unit 51 and the second control unit 52 execute the same calculation as in the present embodiment, and by checking the agreement of the calculation results, the advantage is obtained that an abnormality in the related equipment can be found before driving the automobile V next time.

In step S7704, the agreement between the second control amounts θ1 and θ2 calculated in steps S7702 and S7703, respectively, is determined. This determination of agreement may involve a certain acceptable range with consideration for calculation errors, etc. When the second control amounts θ1 and θ2 match (θ1=θ2), the process proceeds to step S7706, in which the steering control in normal cases is executed. On the other hand, when the second control amounts θ1 and θ2 do not match (θ1≠θ2), the process proceeds to step S7705, in which a warning light provided on the meter display 62 of the instrument panel is turned on to indicate that an abnormality is detected, and the radio control mode is then finished.

Referring again to step S7704, when the second control amounts θ1 and θ2 are the same (θ1=θ2), the process proceeds to step S7706. In steps S7706 and S7707, the second control unit 52 outputs the second control amount θ2 obtained by calculation to the radio control equipment RC via the body control module 1 and the entertainment execution device 41, and turns the steerable wheels of the radio control car. This allows the steerable wheels of the radio control car to turn in response to the amount of operation of the steering wheel 501 by the driver, and the radio control car, which is being remotely controlled, turns in the desired direction.

Subsequently, in step S7708, the radio control equipment RC determines whether or not there is an input from the road surface to the steering gear via the steerable wheels of the radio control car. When there is no input from the road surface, there is no need to apply a reaction force to the steering wheel 501, and the subsequent processing is terminated.

On the other hand, when there is an input from the road surface, the process proceeds to step S7709, in which the radio control equipment RC converts and calculates control signals related to the steering reaction force based on various detection values during the radio control operation into the first control amount F1 to be output to the reaction force motor 505 of the automobile V. This first control amount F1 is obtained as an output control value to the reaction force motor 505 corresponding to the steering reaction torque for the steering wheel 501.

In steps S7710 to S7712, the first control amount F1 output from the radio control equipment RC is output to the first control unit 51, and the first control unit 51, to which the first control amount F1 is input, outputs this to the reaction force motor 505. Through this operation, a pseudo force equivalent to the steering reaction force input from the road surface is applied to the steering wheel 501, and the driver can thus feel the reaction force in response to the driving operation.

Although not illustrated in FIG. 15B, in addition to reflecting the reaction force, which the radio control car receives from the road surface, to the steering wheel 501 of the automobile V, the impact and acceleration/deceleration force which the radio control car receives (gravity G which the driver receives) may be detected by the radio control equipment RC and output from the radio control equipment RC to the entertainment execution device 41, and the actuator of the seat adjuster 9 may be controlled to impart vibration to the driver's seat, or the actuator of the air suspension device may be controlled to change the posture of the automobile body, thereby giving a feeling of cornering or acceleration/deceleration.

The operation when the driver selects the video mode in step S75 of FIG. 12 will then be described. FIG. 16 is a flowchart illustrating a subroutine for the video mode in step S78 of FIG. 12. In the process flow of FIG. 16, one routine of calculation is executed when the video mode is selected.

First, when the driver selects the video mode, the IVI controller 4 starts the integrated control of the entertainment execution device 41 in step S781 of FIG. 16, and the entertainment execution device 41 activates the application software for executing the playback of video. Then, in step S782, the entertainment execution device 41 accesses the cloud server CS, connects to the cloud video platform, and plays back the desired video, here a movie. In step S783, the display device 6 for displaying the video is selected from among the display 63 provided on the front windshield W1, the display 64 provided on the interior mirror M, and the windshield W configured of light control glass.

When the driver selects the display 63 provided on the front windshield W1, the process proceeds to step S784, in which the entertainment execution device 41 displays the content of the selected video on the display 63 provided on the front windshield W1. Likewise, when the driver selects the display 64 provided on the interior mirror M, the process proceeds to step S785, in which the entertainment execution device 41 displays the content of the selected video on the display 64 provided on the interior mirror M. Likewise, when the driver selects the windshield W configured of light control glass, the process proceeds to step S786, in which the light control glass is set to the light-blocking mode, and the process then proceeds to step S787, in which the entertainment execution device 41 displays the content of the selected video on the windshield W configured of light control glass. Thus, the display on the selected display device 6 continues until playback of the movie ends.

As described above, the automobile V according to the present embodiment comprises: the entertainment execution device 41 that executes entertainment software, communicates with the radio control equipment RC, or plays back a video content; and the display device 6 that displays an image output from the entertainment execution device 41 on the windshield W or on the flexible display 65 capable of being raised or lowered between the front windshield W1 and the steering wheel 501. The entertainment can thus be enjoyed using the entertainment execution device 41 in the automobile cabin with a comfortable posture.

Additionally or alternatively, in the automobile V according to the present embodiment, the windshield W comprises the front windshield W1, and the image from the entertainment execution device 41 can therefore be displayed on a large screen, enhancing the sense of realism.

Additionally or alternatively, the automobile V according to the present embodiment further comprises the mode select controller 2 that enables selection between the entertainment mode for operating the entertainment execution device 41 and the driving mode for driving the automobile V and executes control according to each mode, wherein the mode select controller 2 controls the display device 6 so as to: upon selection of the driving mode, display the image output from the entertainment execution device 41 in the first region R1 of the windshield W that is legally permitted for display or on the flexible display 65 in a lowered state; and upon selection of the entertainment mode, display the image output from the entertainment execution device 41 in the second region R2 of the windshield W that is wider than the first region R1 or on the flexible display 65 in a raised state. Through this operation, in the driving mode, forward visibility can be ensured while complying with regulations, and in the entertainment mode, images from the entertainment execution device 41 can be displayed on a large screen, enhancing the sense of realism.

Additionally or alternatively, the automobile V according to the present embodiment further comprises the steering device 5 in which the steering wheel 501 is mechanically separated from the steerable wheels 502 and the operation of the steering wheel 501 is transmitted to the steerable wheels 502 as an electric signal. Upon selection of the entertainment mode, the mode select controller 2 controls the steering device 5 so that the steerable wheels 502 are not turned even when the steering wheel 501 is operated, and so-called stationary steering operation is therefore suppressed. As a result, damage to tires and wheel alignment issues are suppressed, and the entertainment such as games can be enjoyed inside the automobile without adversely affecting the automobile's mechanisms.

Additionally or alternatively, in the automobile V of the present embodiment, the mode select controller 2 includes the selection switch that allows the driver to select between the entertainment mode and the driving mode when the main switch for starting the automobile V is turned on. That is, selection of the entertainment mode is performed only when the automobile V is started by turning on the main switch 3, and it is therefore possible to prevent the entertainment mode from being selected while driving the automobile V.

Additionally or alternatively, in the automobile V of the present embodiment, the mode select controller 2 is installed in the automobile when the automobile is manufactured in accordance with a driver's request. In other words, since the mode select controller 2 is an optional setting when the automobile is manufactured, drivers who do not need the entertainment mode can choose not to install the mode select controller 2. This can avoid the burden of having to perform the mode selection operation every time the automobile V is started.

Additionally or alternatively, in the automobile V of the present embodiment, the windshield W includes the side windshields W2 and W3, the rear windshield W4, and/or the roof windshield, so the entertainment can be enjoyed not only in the driver's seat or the front passenger seat, but also in the back seat. Moreover, the entertainment can be enjoyed not only in a seated posture, but also in a lying posture or a supine posture.

Additionally or alternatively, in the automobile V of the present embodiment, the display device 6 displays the image output from the entertainment execution device 41 also on the interior mirror M, and the entertainment can therefore be enjoyed using the entertainment execution device 41 in the automobile cabin with a comfortable posture.

Additionally or alternatively, in the automobile V of the present embodiment, the windshield W includes a light control glass, and the display device 6 displays the image output from the entertainment execution device 41 on the light control glass in the light-blocking mode; therefore, even when the vehicle is parked outdoors, the entertainment can be enjoyed while protecting the privacy.

Additionally or alternatively, the automobile V of the present embodiment further comprises the monitoring device 17 that monitors surroundings of the subject vehicle, and the mode select controller 2 controls the display device 6 so as to, upon selection of the entertainment mode, stop or halt display of the image output from the entertainment execution device 41 if an abnormality is detected by the monitoring device 17 around the subject vehicle; therefore, even when the image display is stopped or halted, the surroundings of the vehicle can be confirmed such as by visual check, thus preventing vandalism and theft of the vehicle.

The invention claimed is:

1. An automobile comprising:

an entertainment execution device that executes entertainment software, communicates with a remote control device, or plays back a video content;

a display device that displays an image output from the entertainment execution device on a windshield or on a flexible display capable of being raised or lowered between a front windshield and a steering wheel; and a mode select controller that enables selection between an entertainment mode for operating the entertainment execution device only in a state in which the automobile is stopped and a driving mode for driving the automobile and executes control according to each mode, wherein the mode select controller controls the display device so as to:

upon selection of the driving mode, display the image output from the entertainment execution device in a first region of the windshield that is legally permitted for display or on the flexible display in a lowered state; and upon selection of the entertainment mode, display the image output from the entertainment execution device in a second region of the windshield that is wider than the first region or on the flexible display in a raised state.

2. The automobile according to claim 1, wherein the windshield comprises the front windshield.

3. The automobile according to claim 1, wherein the mode select controller includes a selection switch that allows a driver to select between the entertainment mode and the driving mode when a main switch for starting the automobile is turned on.

4. The automobile according to claim 1, wherein the mode select controller is installed in the automobile when the automobile is manufactured in accordance with a driver's request.

5. The automobile according to claim 1, wherein the windshield includes at least one of a side windshield, a rear windshield, and a roof windshield.

6. The automobile according to claim 1, wherein the display device displays the image output from the entertainment execution device also on an interior mirror.

7. The automobile according to claim 1, wherein the windshield includes a light control glass, and the display device displays the image output from the entertainment execution device on the light control glass in a light-blocking mode.

8. An automobile comprising:

an entertainment execution device that executes entertainment software, communicates with a remote control device, or plays back a video content;

a display device that displays an image output from the entertainment execution device on a windshield or on a flexible display capable of being raised or lowered between a front windshield and a steering wheel;

a mode select controller that enables selection between an entertainment mode for operating the entertainment execution device and a driving mode for driving the automobile and executes control according to each mode; and a steering device in which the steering wheel is mechanically separated from steerable wheels and an operation of the steering wheel is transmitted to the steerable wheels as an electric signal, wherein the mode select controller controls the display device so as to:

upon selection of the driving mode, display the image output from the entertainment execution device in a first region of the windshield that is legally permitted for display or on the flexible display in a lowered state;

upon selection of the entertainment mode, display the image output from the entertainment execution device in a second region of the windshield that is wider than the first region or on the flexible display in a raised state; and upon selection of the entertainment mode, the mode select controller controls the steering device so that the steerable wheels are not turned even when the steering wheel is operated.

9. The automobile according to claim 8, wherein the windshield comprises at least one of the front windshield, a side windshield, a rear windshield, and a roof windshield.

10. The automobile according to claim 8, wherein the mode select controller includes a selection switch that allows a driver to select between the entertainment mode and the driving mode when a main switch for starting the automobile is turned on.

11. The automobile according to claim 8, wherein the mode select controller is installed in the automobile when the automobile is manufactured in accordance with a driver's request.

12. The automobile according to claim 8, wherein the display device displays the image output from the entertainment execution device also on an interior mirror.

13. The automobile according to claim 8, wherein the windshield includes a light control glass, and the display device displays the image output from the entertainment execution device on the light control glass in a light-blocking mode.

14. An automobile comprising:

an entertainment execution device that executes entertainment software, communicates with a remote control device, or plays back a video content;

a display device that displays an image output from the entertainment execution device on a windshield or on a flexible display capable of being raised or lowered between a front windshield and a steering wheel;

a mode select controller that enables selection between an entertainment mode for operating the entertainment execution device and a driving mode for driving the automobile and executes control according to each mode; and a monitoring device that monitors surroundings of a subject vehicle, wherein the mode select controller controls the display device so as to:

upon selection of the driving mode, display the image output from the entertainment execution device in a first region of the windshield that is legally permitted for display or on the flexible display in a lowered state;

upon selection of the entertainment mode, display the image output from the entertainment execution device in a second region of the windshield that is wider than the first region or on the flexible display in a raised state; and the mode select controller controls the display device so as to, upon selection of the entertainment mode, stop or halt display of the image output from the entertainment execution device when an abnormality is detected by the monitoring device around the subject vehicle.

15. The automobile according to claim 14, wherein the windshield comprises at least one of the front windshield, a side windshield, a rear windshield, and a roof windshield.

16. The automobile according to claim 14, wherein the mode select controller includes a selection switch that allows a driver to select between the entertainment mode and the driving mode when a main switch for starting the automobile is turned on.

17. The automobile according to claim 14, wherein the mode select controller is installed in the automobile when the automobile is manufactured in accordance with a driver's request.

18. The automobile according to claim 14, wherein the display device displays the image output from the entertainment execution device also on an interior mirror.

19. The automobile according to claim 14, wherein the windshield includes a light control glass, and the display device displays the image output from the entertainment execution device on the light control glass in a light-blocking mode.

* * * * *